United States Patent
Lobert et al.

(10) Patent No.: US 10,087,278 B2
(45) Date of Patent: Oct. 2, 2018

(54) ALKOXYSILYL-CONTAINING ADHESIVE SEALANTS HAVING IMPROVED TEAR PROPAGATION RESISTANCE

(71) Applicant: Evonik Degussa GmbH, Essen (DE)

(72) Inventors: Matthias Lobert, Essen (DE); Anke Lewin, Duesseldorf (DE); Wilfried Knott, Essen (DE); Frank Schubert, Neukirchen-Vluyn (DE); Michael Ferenz, Essen (DE)

(73) Assignee: Evonik Degussa GmbH, Essen (DE)

( * ) Notice: Subject to any disclaimer, the term of this patent is extended or adjusted under 35 U.S.C. 154(b) by 2 days.

(21) Appl. No.: 15/395,449

(22) Filed: Dec. 30, 2016

(65) Prior Publication Data

US 2017/0226285 A1    Aug. 10, 2017

(30) Foreign Application Priority Data

Feb. 4, 2016   (EP) .................................. 16154170

(51) Int. Cl.
| | | |
|---|---|---|
| *C08G 18/50* | (2006.01) | |
| *C09J 175/08* | (2006.01) | |
| *C08G 18/10* | (2006.01) | |
| *C08G 18/75* | (2006.01) | |
| *C08G 18/48* | (2006.01) | |
| *C08G 18/28* | (2006.01) | |

(52) U.S. Cl.
CPC ......... *C08G 18/5096* (2013.01); *C08G 18/10* (2013.01); *C08G 18/289* (2013.01); *C08G 18/48* (2013.01); *C08G 18/755* (2013.01); *C09J 175/08* (2013.01); *C08G 18/4804* (2013.01)

(58) Field of Classification Search
None
See application file for complete search history.

(56) References Cited

U.S. PATENT DOCUMENTS

| | | |
|---|---|---|
| 2010/0041910 A1 | 2/2010 | Schubert et al. |
| 2011/0042004 A1 | 2/2011 | Schubert et al. |
| 2011/0046305 A1* | 2/2011 | Schubert ............... C08G 18/12 524/869 |
| 2013/0090429 A1 | 4/2013 | Zhang et al. |
| 2013/0237616 A1* | 9/2013 | Ferenz .................. C08G 65/00 514/785 |
| 2013/0245304 A1 | 9/2013 | Schubert et al. |
| 2015/0057369 A1 | 2/2015 | Ferenz et al. |
| 2015/0159068 A1 | 6/2015 | Schubert et al. |

FOREIGN PATENT DOCUMENTS

| | | |
|---|---|---|
| EP | 2 093 244 A1 | 8/2009 |
| EP | 2 289 972 A1 | 3/2011 |
| EP | 2 840 104 A1 | 2/2015 |
| WO | WO 2012/003216 A1 | 1/2012 |

OTHER PUBLICATIONS

Search Report dated May 20, 2016 in European Patent Application No. 16154170.1.
Gerhard Schottner, "Hybrid Sol-Gel-Derived Polymers: Applications of Multifunctional Materials", Chemistry of Materials, 2001, 13, XP-002717483, pp. 3422-3435.
Plinio Innocenzi, et al., "Sol-gel reactions of 3-glycidoxypropyltrimethoxysilane in a highly basic aqueous solution", The International Journal for Inorganic, organometallic and Bioinorganic Chemistry, No. 42, Jan. 2009, XP055272006, pp. 9146-9152.

\* cited by examiner

*Primary Examiner* — Marc S Zimmer
(74) *Attorney, Agent, or Firm* — Nexsen Pruet, LLC; Philip P. McCann

(57) ABSTRACT

Specific alkoxysily-modified polymers bearing alkoxysilyl groups distributed randomly or in block fashion along the polyether chain, and not just located at the chain termini, a process for preparing these alkoxysilyl-modified polymers, and compositions comprising these alkoxysilyl-modified polymers are provided.

14 Claims, No Drawings

ALKOXYSILYL-CONTAINING ADHESIVE SEALANTS HAVING IMPROVED TEAR PROPAGATION RESISTANCE

BACKGROUND OF THE INVENTION

Field of the Invention

The present invention provides specific alkoxysilyl-modified polymers, a process for preparing them, compositions comprising these alkoxysilyl-modified polymers, and their use, especially as adhesives and sealants that contain alkoxysilyl groups.

Description of the Related Art

In a multiplicity of operational procedures and manufacturing processes, an increasingly important role is being played by the use of adhesives and adhesive sealants, which additionally fulfil a sealing function. Relative to other joining processes, such as welding or riveting, for example, these processes offer advantages in terms of weight and costs, but also advantages in the transfer of stress between the components joined.

As compared with the joining of different materials, adhesive bonding has the advantage, moreover, that it is able to compensate the differences in deformation behaviour and in thermal expansion coefficients of the materials, especially when elastic adhesives are used, and hence actually allows such combinations of materials to be joined.

In the literature there are various examples of elastic adhesives. In recent years, in particular, adhesives based on what are called silane-modified polymers have found widespread application by virtue of their universal usefulness. Many examples in the literature address the formulation of adhesive, adhesive sealant and sealant systems for a multiplicity of applications. Mention may be made here, only by way of example, of specifications WO 2006/136211 A1, EP 1036807 B1 and WO 2010/004038 A1, which set out the fundamental concepts of the formulating technologies and formulating constituents that are customary in the art. The base polymer used is customarily a polyether which has been provided, in different processes, with moisture-crosslinking terminal alkoxysilane groups. This product group includes not only the silylated polyethers marketed by the company Kaneka under the name MS Polymer®, but also the so-called silylated polyurethanes (SPUR products, for example Desmoseal® S, Bayer Materials Science).

The use of polyether backbones in these products is an advantage primarily on account of their low glass transition temperature and the elastic deformation characteristics which are thereby ensured even at low temperatures. However, the silylated polyethers as described in specifications JP 09012863, JP 09012861 and JP 07062222, in particular, on account of their weak intermolecular interaction under service conditions, and the associated reduced intermolecular transmission of forces, do not possess the optimum profile for use in adhesives or sealants.

Silylated polyurethanes as described in DE 69831518 (WO 98/47939 A1) are clearly an advantage here, since the urethane functions and the urea functions likewise present in specific products allow a high degree of intermolecular force transmission and hence high strengths on the part of the bonds. Silylated polyurethanes as well, however, are hampered by the problems associated with polyurethanes, such as lack of temperature stability and yellowing stability, for example, and also of UV stability, which for certain applications is not sufficient.

Alkoxylation products can be prepared, according to the prior art, through the reaction of a starter bearing one or more OH groups with propylene oxide and with one or more epoxide-group-containing alkoxysilyl compounds and, depending on embodiment, with one or more comonomers, by means of double metal cyanide catalysts (DMC catalysts), according to EP 2093244 (US 2010/0041910), EP 2636696 A1 (U.S. Pat. No. 9,035,011 B2), EP 2840104 A (US 20150057369 A1), WO 2014170072 A2 and WO 2015082264 A1, and the aftertreatment methods described in EP 2415796 (US 2012/028022), EP 2415797 (US 2012/029090) and EP 2840104 A (US 20150057369 A1).

But the alkoxysilyl-modified adhesives and sealants used for ever more varied applications have to contend with ever more demanding expectations with regard to their performance properties.

SUMMARY OF THE INVENTION

It was thus an object of the present invention to provide alkoxysilyl-modified polymers having viscosities of good processability, and additionally exhibiting significantly better performance properties still compared to the current state of the art.

It was additionally an object of the present invention to provide a simple process for preparing such alkoxysilyl-modified polymers, and the provision of curable compositions based on such alkoxysilyl-modified polymers.

These objects were achieved by the providing of alkoxysilyl-modified polymers which have a polyether backbone and bear alkoxysilyl groups both in the central and in the peripheral region of the alkoxysilyl-modified polymer.

DETAILED DESCRIPTION OF THE INVENTION

The central region in the alkoxysilyl-modified polymer refers especially to that region of the polyether backbone which has been formed by addition of alkylene oxide(s) and of epoxide(s) that bear alkoxysilyl groups onto a dihydroxy-functional starter (A) and is joined via reaction with a diisocyanate to the peripheral region(s) of the polyether backbone which has/have been formed by addition of alkylene oxide(s) and of epoxide(s) that bear alkoxysilyl groups onto a monohydroxy-functional starter (B).

Preferred alkoxysilyl-modified polymers of the invention correspond to the constitution shown in formula (I).

Alkoxysilyl-modified polymers of this kind are obtainable by means of a process comprising the steps of (1) reacting at least one dihydroxy-functional starter selected from the group of the alcohols or polyetherols with at least one alkylene oxide and at least one epoxide bearing alkoxysilyl groups, (2) reacting at least one monohydroxy-functional starter selected from the group of the alcohols or polyetherols with at least one alkylene oxide and at least one epoxide bearing alkoxysilyl groups, and (3) reacting the products from process steps (1) and (2) with at least one diisocyanate and optionally further reactants.

In process step (1), the central region of the polyether backbone (in formula (I)—fragment D) of the final alkoxysilyl-modified polymer of the invention is formed and, in process step (2), the peripheral region(s) (in formula (I)— fragments M). Finally, these polyether fragments M-H and D-H are joined to one another in process step (3) by reaction with diisocyanates.

It has been found that, surprisingly, the alkoxysilyl-modified polymers of the invention where both the fragments D and M shown in formula (I) are alkoxysilyl-functional have significantly advantageous performance properties with respect to alkoxysilyl-modified polymers which bear an alkoxysilyl functionality only in one of the M and D fragments.

Especially surprising was the very good extensibility of the inventive products containing alkoxysilyl modifications in the central fragment D as well, since the prior art does in fact teach that particularly terminally alkoxysilyl-modified polymers having long non-functional central polyether chains lead to high flexibilities.

The introduction of alkoxysilyl functionalities, in addition to the peripheral fragments, into the central fragment as well should lead to improved network formation within the scope of moisture crosslinking, which is also demonstrated by improved resilience in the case of products of the invention. The fact that this improved network formation leads to higher tensile stress at break is plausible to the person skilled in the art, but the fact that this was not at the expense of a significant reduction in elongation at break was not to be expected.

The present invention therefore provides alkoxysilyl-modified polymers, especially of formula (I), which bear alkoxysilyl groups both in the central region and in the peripheral region of the polymer backbone.

The present invention additionally provides a process for preparing such polymers, comprising the steps of
(1) reacting at least one dihydroxy-functional starter (A) selected from the group of the alcohols or polyetherols with at least one alkylene oxide and at least one epoxide bearing alkoxysilyl groups,
(2) reacting at least one monohydroxy-functional starter (B) selected from the group of the alcohols or polyetherols with at least one alkylene oxide and at least one epoxide bearing alkoxysilyl groups, and
(3) reacting the products from process steps (1) and (2) with at least one diisocyanate and optionally further reactants.

The present invention further provides compositions comprising these alkoxysilyl-modified polymers of the invention.

The subject-matter of this invention enables the provision of polymers having improved tear propagation resistance, especially of adhesives and/or sealants having improved tear propagation resistance. The determination of tear propagation resistance within the context of the present invention is elucidated in the examples section.

The alkoxysilyl-modified polymers of the invention, the process for preparation thereof and compositions comprising the alkoxysilyl-modified polymers of the invention are described hereinafter by way of example, without any intention that the invention should be confined to these illustrative embodiments. When ranges, general formulae or compound classes are specified hereinbelow, these shall encompass not just the corresponding ranges or groups of compounds that are explicitly mentioned but also all subranges and subgroups of compounds obtainable by extracting individual values (ranges) or compounds. Where documents are cited in the context of the present description, their content shall fully belong to the disclosure content of the present invention, particularly in respect of the factual position in the context of which the document was cited.

Percentages specified hereinbelow are by weight unless otherwise stated. Where mean values are reported hereinafter, these are the numerical mean, unless stated otherwise. Physical properties specified below, such as viscosities or the like, for example, are physical properties measured at 25° C. unless otherwise stated. The viscosity is determined at a temperature of 25° C. and a shear rate of 10 l/s with an Anton Paar MCR 301 rheometer.

The hydrophilic or hydrophobic character of the final alkoxysilyl-modified polymers can be adjusted via the nature and construction of the starters (A) and/or (B) which bear OH group(s), and/or via one or more comonomers which are introduced during the synthesis.

According to EP 2 093 244, the disclosure content of which is referred to particularly with regard to their structures and processes disclosed therein, and the disclosure content of which in relation to the structures disclosed therein is hereby incorporated in full as part of the present description, it was possible for the first time to prepare alkoxylation products which bear alkoxysilyl groups and which, in contrast to the prior art known up until that point, exhibit alkoxysilyl groups distributed randomly or in block fashion along the polyether chain, and not just located at the chain termini. These compounds, furthermore, are notable for a terminal OH group, which is a consequence of the reaction.

It will be apparent to the person skilled in the art that the presence of the terminal OH groups, by contrast with the prior art of the terminally alkoxysilyl-modified polymers, gives rise to a further degree of freedom, namely that of further functionalizing the alkoxysilyl-modified polyether fragments formed as intermediates with the aid of a chemical reaction, and hence having a lasting positive influence on the performance properties of the final alkoxysilyl-modified polymer.

In the context of the present invention the term "alkoxylation products" or "polyethers" encompasses not only polyethers, polyetherols, polyether alcohols and polyetheresterols but also polyethercarbonate-ols, which may be used synonymously with one another. At the same time, the term "poly" does not necessarily have to mean that there are a multiplicity of ether functionalities or alcohol functionalities in the molecule or polymer. Instead, this merely suggests the presence at least of repeat units of individual monomer units or else compositions that have a relatively high molar mass and additionally a certain polydispersity.

The word fragment "poly" encompasses in the context of this invention not just compounds having three or more repeat units of one or more monomers in the molecule, but in particular also those compositions of compounds which have a molecular weight distribution and the mean molecular weight of this distribution is at least 200 g/mol. This definition takes account of the fact that it is customary in the field of industry in question to refer to such compounds as polymers even if they do not appear to conform to a polymer definition as per OECD or REACH guidelines.

The various fragments in the formulae (Ia) and (II) below may be distributed statistically. Statistical distributions may have a blockwise construction with an arbitrary number of blocks and an arbitrary sequence, or may be subject to a randomized distribution; they may also be constructed in alternation or else may form a gradient over the chain; in particular they may also form all hybrid forms in which, optionally, groups with different distributions may follow one another. The formulae (I), (Ia) and (II) describe polymers which have a molar weight distribution. The indices therefore represent the numerical average over all of the monomer units.

The indices a, b, c, d, e, f, g, h, i, j, t, u, v, w and y that are used in the formulae, and also the value ranges for the specified indices, may be understood as average values of the possible statistical distribution of the structures and/or mixtures thereof that are actually present. This applies even to those structural formulae which as such, per se, are reproduced exactly, such as for formula (Ia) and (II), for example.

The alkoxysilyl-modified polymers of the invention preferably correspond to formula (I)

   Formula (I)

and have the feature that the M and D fragments are linked not to one another but instead with one another via the UR and/or AP groups, and the UR and AP groups are not linked to one another but instead, accordingly, are linked with one another via the M and D fragments. The indices are as follows:

i=1 to 2, preferably greater than 1 to 2, more preferably 2,
j=1 to 10, preferably 1 to 8, more preferably 2 to 6, especially preferably greater than or equal to 1,
u=0 to 11, preferably 1 to 8, more preferably 2 to 6, more particularly 2 to 4,
v=0 to 6, preferably greater than 0 to 4, more particularly 0.1 to 2,
with the proviso that $u+v \geq 1$, preferably $\geq 2$,
where
M is independently at each occurrence an alkoxysilyl-modified polyether radical, preferably having 8 to 400 carbon atoms, M especially preferably being a radical of the formula (Ia) with

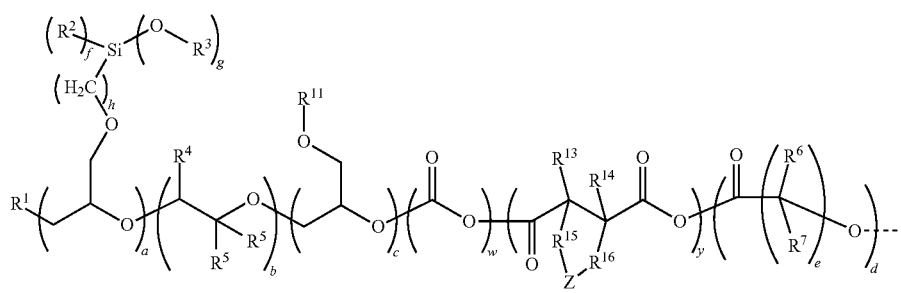
Formula (Ia)

with
a=0.1 to 100, preferably 0.5 to 50, further preferably 1 to 10, more preferably 1 to 5, especially preferably 1, 1.5 or 2.5,
b=2 to 1000, preferably 2 to 500, more preferably greater than 2 to 400, especially preferably $\geq 10$ to 100,
c=0 to 200, preferably 0 to 100, further preferably greater than 0 to 80, especially preferably $\geq 0$ to 50, for example 1 to 50,
d=0 to 200, preferably 0 to 100, further preferably greater than 0 to 80, especially preferably $\geq 0$ to 50, for example 1 to 50,
w=0 to 200, preferably 0 to 100, further preferably greater than 0 to 80, especially preferably $\geq 0$ to 50, for example 1 to 50,
y=0 to 500, preferably 0 to 300, more preferably 0 to 200 and especially preferably $\geq 0$ to 100, for example 1 to 100,
e=1 to 10,
f=0 to 2,
g=1 to 3
with the proviso that g+f=3,
h=0 to 10, preferably 1 to 6, especially preferably 1, 2 or 3,
with the proviso that the groups with the indices a, b, c, d, w and y are freely permutable over the molecule chain, it being disallowed for each of the groups with the indices w and y to follow itself or the other respective group, and
with the proviso that the various monomer units both of the fragments having the indices a, b, c, d, w and y and of any polyoxyalkylene chain present in the substituent $R^1$ may be constructed blockwise among one another, it also being possible for individual blocks to occur multiply and to be distributed statistically among one another, or else are subject to a statistical distribution and, moreover, are freely permutable with one another, in the sense of being for arrangement in any desired order, with the restriction that each of the groups of the indices w and y must not follow itself or the other respective group,
and where
$R^1$=independently at each occurrence a saturated or unsaturated, linear or branched organic hydrocarbyl radical which may contain O, S and/or N as heteroatoms, the hydrocarbyl radical preferably contains 1 to 400 carbon atoms, preferably 2, 3 or 4 to 200 carbon atoms,
$R^2$=independently at each occurrence an alkyl group having 1 to 8 carbon atoms, more particularly methyl or ethyl, propyl, isopropyl,
$R^3$=independently at each occurrence an alkyl group having 1 to 8 carbon atoms, more particularly methyl, ethyl, propyl, isopropyl,
$R^4$=independently at each occurrence a hydrogen radical, an alkyl group having 1 to 20 carbon atoms, or an aryl or alkaryl group, preferably hydrogen, methyl, ethyl, octyl, decyl, dodecyl, phenyl, benzyl, more preferably hydrogen, methyl or ethyl,
$R^5$=independently a hydrogen radical or an alkyl group having 1 to 8 carbon atoms, preferably hydrogen, methyl or ethyl, especially preferably hydrogen,
or $R^4$ and one of the $R^5$ radicals may together form a ring including the atoms to which $R^4$ and $R^5$ are bonded, this ring preferably containing 5 to 8 carbon atoms,
$R^6$ and $R^7$=independently at each occurrence a hydrogen radical, an alkyl group having 1 to 20 carbon atoms, an aryl or alkaryl group and/or an alkoxy group, preferably a methyl group, $R^{11}$=independently at each occurrence a saturated or unsaturated, aliphatic or aromatic hydrocarbyl radical which has 2 to 30 carbon atoms, especially to 24 carbon atoms, and may optionally be substituted, preferably an alkyl group having 1 to 16 carbon atoms, more preferably having 6 to 12 carbon atoms, the chain of which may be interrupted by oxygen and which may bear further functional groups, for example carboxyl groups optionally esterified with alcohols, for example methanol, ethanol, propanol, butanol or hexanol, hydroxyl groups optionally esterified with acids such as acetic acid, butyric acid, neodecanoic acid or (meth)acrylic acid or the polymers of (meth)acrylic acid, or an aryl group having 6 to 2.0 carbon atoms, or an aralkyl group having 7 to 30 and preferably 7 to 20 carbon atoms, preferably selected from methyl, ethyl, propyl, butyl, isobutyl, tert-butyl, 2-pentyl, 3-pentyl, 2-methylbut-yl, 3-methylbutyl, 2-methyl-2-butyl, 3-methyl-2-butyl, 2,2-dimethylpropyl, hexyl, heptyl, octyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, 2-octyldodecyl, triphenylmethyl, $C(O)$—$(CH_2)_5$—$C$—$(CH_3)_3$— (radical of neodecanoic acid), $C_{12}/C_{14}$-alkyl, phenyl, cresyl, tert-butylphenyl or benzyl group, more preferably a 2-ethylhexyl, $C(O)$—$(CH_2)_5$—$C$—$(CH_3)_3$— (radical of neodecanoic acid), $C_{12}/C_{14}$-alkyl, phenyl, cresyl, tert-butylphenyl group, most preferably a tert-butylphenyl or 2-ethylhexyl group, $R^{13}$, $R^{14}$=independently hydrogen and/or an organic radical, preferably alkyl, alkenyl, alkylidene, alkoxy, aryl and/or aralkyl groups, or else $R^{13}$ and/or $R^{14}$ may optionally be absent, where, when $R^{13}$ and $R^{14}$ are absent, there is a C=C double bond in place of the $R^{13}$ and $R^{14}$ radicals, the bridging Z fragment may be present or absent, where, in the absence of the bridging Z fragment, $R^{15}$ and $R^{16}$=independently at each occurrence hydrogen and/or an organic radical, preferably alkyl, alkenyl, alkylidene, alkoxy, aryl and/or aralkyl groups, and, if one of the radicals $R^{13}$ or $R^{14}$ is absent, the respective geminal radical (i.e. $R^{15}$ if $R^{13}$ is absent and $R^{16}$ if $R^{14}$ is absent) is an alkylidene radical, preferably methylidene (=$CH_2$), where, in the presence of the bridging Z fragment, $R^{15}$ and $R^{16}$=hydrocarbyl radicals bridged cycloaliphatically or aromatically via the Z fragment, where Z represents a divalent alkylene or alkenylene radical which may have further substitution, the fragment with the index y may be obtained, for example, by the incorporation of cyclic anhydrides; preferred cyclic anhydrides are succinic anhydride, maleic anhydride, itaconic anhydride, glutaric anhydride, adipic anhydride, citraconic anhydride, phthalic anhydride, hexahydrophthalic anhydride and trimellitic anhydride and also polyfunctional acid anhydrides such as pyromellitic dianhydride, benzophenone-3,3',4,4'-tetracarboxylic dianhydride, 1,2,3,4-butanetetracarboxylic dianhydride, or radically polymerized homopolymers or copolymers of maleic anhydride with ethylene, isobutylenes, acrylonitrile, vinyl acetate or styrene; particularly preferred anhydrides are succinic anhydride, maleic anhydride, itaconic anhydride, glutaric anhydride, adipic anhydride, citraconic anhydride, phthalic anhydride, hexahydrophthalic anhydride, and where, for the D fragment:

D is a polyether radical -$(D^A)_t D^X$ where t is 2, where $D^X$ is a t-valent functional, saturated or unsaturated, linear or branched organic hydrocarbyl radical which may contain O, S, Si and/or N as heteroatoms, with each of the $D^A$ radicals covalently bonded to the $D^X$ radical, the hydrocarbyl radical preferably containing 8 to 1500 carbon atoms, the carbon chain of the hydrocarbyl radical preferably being interrupted by oxygen atoms, the hydrocarbyl radical preferably comprising silicon atom-containing substituents, the silicon atom-containing substituents preferably being alkoxysilyl groups, the hydrocarbyl radical interrupted by oxygen atoms preferably being a polyoxyalkylene radical, polyether radical and/or polyetheralkoxy radical, or $D^X$ may be a singly or multiply fused phenolic group, or $D^X$ more preferably may be a t-valent radical of a t-times hydroxylated alcohol, polyetherol, polyesterol, siloxane, perfluorinated polyetherol, (poly)urethane or saccharide, preferably OH-functional polyethers, polyesters, polycarbonates, polyetheresters or perfluorinated polyethers and copolymers thereof, especially preferably OH-functional polyethers or polyesters, and where $D^A$ is a fragment of the formula (II)

Formula (II)

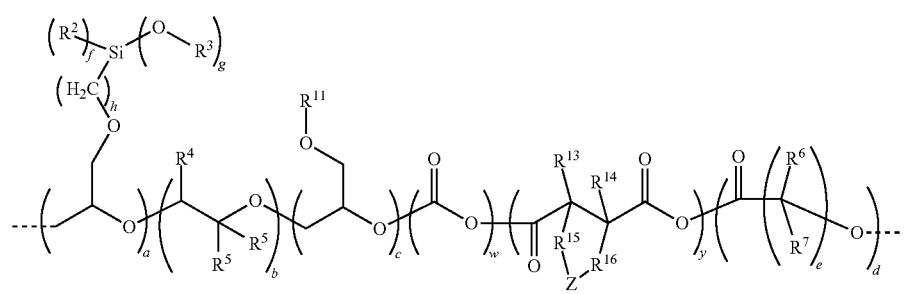

where a to h, w and y and $R^2$ to $R^{16}$ independently at each occurrence are defined as in formula (Ia), with the proviso that the sum total of all indices b in the formulae (Ia) and (II) is at least 5, preferably at least 10, especially preferably at least 15, and the sum of all indices a in the formulae (Ia) and (II) must be greater than 2, UR independently at each occurrence are identical or different divalent radicals of the form —U-$D^C$-U—, where U is a —C(O)—NH— group which is bonded via the nitrogen to $D^C$, and $D^C$ independently at each occurrence is a divalent substituted or unsubstituted, linear or branched, saturated or unsaturated hydrocarbyl radical having 1 to 30 carbon atoms, selected from alkyl, alkenyl, aryl or alkaryl radicals, and may optionally be interrupted by heteroatoms such as O, N and/or S, or is an aryl or alkaryl group; $D^C$ preferably being a divalent hydrocarbyl radical having 6-30 carbon atoms, and $D^C$ preferably being an isophorone radical, especially as specified in formula (VIII).

AP are independently of one another identical or different radicals of the general formula (IIIa) or (IIIb)

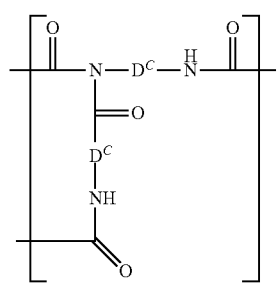

Formula (IIIa)

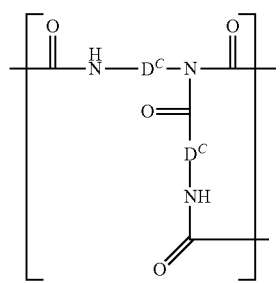

Formula (IIIb)

The fragment UR may be termed an urethane unit. The fragment AP may be termed an allophanate unit.

The $R^{11}$ radical may bear further functional groups, such as, for example, (meth)acrylic acid and/or polymers of (meth)acrylic acid. Hydroxyl groups optionally present may therefore be esterified with acrylic acid and/or methacrylic acid. The double bonds of the (meth)acrylic acid are polymerizable, under radical induction for example, UV induction for example.

The polymerization of the (meth)acrylic groups may take place after the preparation of the polyether. It may also be carried out with the alkoxylation products of the invention, with the products of the process of the invention, and also after the inventive use.

Particular preference is given to alkoxysilyl-modified polymers of the formula (I) in which the alkoxylation products that correspond to the D fragments are based on dihydroxy-functional starters (A) with (H-$D^A$)$_t$$D^X$ and t=2, and the alkoxylation products that correspond to the M fragments are based on monohydroxy-functional starters (B) with (H-$D^A$)$_t$$D^X$ and t=1. More preferably, the D and M fragments are formed from propylene oxide (PO) and 3-glycidyloxypropyltriethoxysilane (GLYEO), and optionally additionally ethylene oxide (EO) and/or glycidyl ether(s) as monomer units. Especially preferably, the D and M fragments are formed exclusively from GLYEO and PO as monomer units.

The fragment $D^X$ of the starter (B) with (H-$D^A$)$_t$$D^X$ and t=1 is preferably, independently at each occurrence, an OFT-functional monovalent linear or branched, saturated or unsaturated hydrocarbyl radical having 1 to 500 carbon atoms, preferably selected from alkyl alkenyl, aryl or alkaryl radicals, which may optionally be interrupted by heteroatoms such as O, N and/or S and may also be further substituted, for example by acid ester, amide, alkyl-trialkoxysilane or alkyl-alkyldialkoxysilane groups, the hydrocarbyl radical having preferably from 1 to 30, more preferably from 2 to 18 and very preferably from 3 to 12 carbon atoms. The species in question is more preferably methanol, ethanol; propanol, isopropanol, butanol, isobutanol, tert-butanol, 2,2,4-trimethyl-1,3-pentanediol monoisobutyrate (Texanol from Exxon), octanol, 2-ethylhexanol, 2-propylheptanol, allyl alcohol, decanol, dodecanol, $C_{12}$/$C_{14}$ fatty alcohol, phenol, all constitutional isomers of cresol, benzyl alcohol, stearyl alcohol, more particularly butanol, 2,2,4-trimethyl-1,3-pentanediol monoisobutyrate (Texanol from Exxon), allyl alcohol, 2-ethylhexanol or 2-propylheptanol.

In one particular embodiment of the invention, the OH-functional hydrocarbyl radical contains 7 to 100 carbon atoms, and the carbon chain of the hydrocarbyl radical is preferably interrupted by oxygen atoms; the hydrocarbyl radical interrupted by oxygen atoms is preferably a polyoxyalkylene radical, polyether radical and/or polyetheralkoxy radical, or else a polyester, polycarbonate or polyetherester radical, or mixtures of the aforementioned radicals.

The mono-hydroxy-functional compounds which can be used as starter (B) are preferably compounds having molar masses of 32 to 2000 g/mol, more preferably 50 to 1000 g/mol, more particularly 60 to 200 g/mol. These compounds can be used in any desired mixtures with one another or as pure substances. It is also possible to use hydroxyl compounds having pendant substitution by substituents containing alkoxysilyl groups, or by alkoxysilyl groups directly, especially such as the silyl polyethers described in EP 2093244, as starters (B).

The $D^X$ fragment of the starter (A) with (H-$D^A$)$_t$$D^X$ and t=2 is preferably a compound selected from low molecular mass compounds such as ethylene glycol, propylene glycol, di/triethylene glycol, 1,2-propylene glycol, di/tripropylene glycol, neopentyl glycol, 1,4-butanediol, 1,2-hexanediol and 1,6-hexanediol, trimethylolpropane monoethers or glycerol monoethers such as monoallyl ethers, for example, and also from high molecular mass compounds such as polyethylene oxides, polypropylene oxides, polyesters, polycarbonates, polycarbonate polyols, polyester polyols, polyetheresters, polyetherols, polyethercarbonates, polyamides and polyurethanes, which may optionally have one or more alkoxysilyl group(s).

Usable with preference are starters (A) and/or (B) having a melting point of less than 150° C., more preferably less than 100° C., and a molar mass between 200-8000 g/mol, especially preferably of 400-4000 g/mol.

Preferred starters (A) and/or (B) are hydroxyl-terminated polyethers which have been prepared by a reaction of propylene oxide optionally in combination with ethylene oxide. All said starters may also be used in any desired mixtures.

Particularly preferred starters (A) are polyethers containing hydroxyl groups, for example Desmophen® 2061 BD or Acclaim 4200 (Bayer Material Science), and polyesters containing hydroxyl groups, for example Desmophen® 1700 (Bayer Material Science), polyesterpolyols, for example Stepanpol® PS-2002 (Stepan Company), Priplast 1838 (Croda), and polycarbonates containing hydroxyl groups, for example Oxymer® M112 (Perstorp), Desmophen® C1200 (Bayer), Desmophen® C2200 (Bayer Material Science) Especially preferred starters (A) are polypropylene glycols (Desmophen® 2061 BD or Acclaim 4200 (Bayer Material Science)) and polytetrahydrofurans (available in diverse molar weights as Terathane® (Invista) and PolyTHF® (BASF), e.g. PolyTHF 2000)).

Additionally particularly preferred are alkoxysilyl-modified polymers of the invention which, based on the individual molecule, have a numerical average of more than one alkoxysilyl group per group UR.

Additionally preferred are alkoxysilyl-modified polymers in which the index i is 2, the index j is 1 to 3 and the index u is 2 to 4.

In a preferred embodiment, it is a feature of the alkoxysilyl-modified polymers of the invention that, in formula (I), the ratio of the indices a in the fragments M to D obeys the following equation: a (M)>2*a(D).

In one especially preferred embodiment, the alkoxysilyl-modified polymers of the invention are of the formula (I) with
i=1 to 2, preferably greater than 1 to 2, more preferably 2
j=1 to 6, preferably 1, 2, 3 or 4
u=j+1
v=0
where M corresponds to formula (Ia) with
a=0.1 to 50, preferably 0.5 to 20, more preferably 1 to 4,
b=10 to 500, more preferably 12 to 100,
c=0 to 20, preferably 0 to 4
d=0 to 20, preferably 0
w=0 to 20, preferably 0
y=0 to 20, preferably 0,
e=1 to 10,
f=0 to 2,
g=1 to 3,
with the proviso that g+f=3,
h=1, 2 or 3 and
$R^1$=independently at each occurrence a saturated or unsaturated, linear or branched organic hydrocarbyl radical which may contain O, S and/or N as heteroatoms; the hydrocarbyl radical contains preferably 1 to 400 carbon atoms, preferably 2, 3 or 4 to 200 carbon atoms, more preferably an alkyl radical having 2 to 12, preferably having 3 to 6, carbon atoms,
and where D corresponds to formula (II) with
a=0 to 10, preferably greater than 0.1 to 5, more preferably 0.2 to 2, more
particularly 0.25 to 1,
b=10 to 700, more preferably 12 to 350,
c=0 to 20, preferably 0 to 10
d=0 to 20, preferably 0
w=0 to 20, preferably 0
y=0 to 20, preferably 0,
e=1 to 10,
f=0 to 2,
g=1 to 3,
with the proviso that g+f=3,
h=1, 2 or 3
and where for formula (Ia), and formula (II) (radicals not explicitly stated here are as defined above):
$R^2$=independently at each occurrence a methyl or ethyl, propyl or isopropyl group, preferably a methyl or ethyl group
$R3$=independently at each occurrence a methyl or ethyl, propyl or isopropyl group, preferably a methyl or ethyl group
$R^4$=independently at each occurrence hydrogen or a methyl, ethyl, octyl, decyl, dodecyl, phenyl or benzyl group, more preferably hydrogen or a methyl or ethyl group,
$R^5$=independently at each occurrence hydrogen, methyl or ethyl, especially preferably hydrogen.
$R^{11}$=independently at each occurrence an optionally substituted alkyl chain having 4 to 20 carbon atoms, preferably having 5 to 16 carbon atoms, more preferably having 6 to 12 carbon atoms, preferably selected from methyl, ethyl, propyl, butyl, isobutyl, tert-butyl, 2-pentyl, 3-pentyl, 2-methylbutyl, 3-methylbutyl, 2-methyl-2-butyl, 3-methyl-2-butyl, 2,2-dimethylpropyl, hexyl, heptyl, octyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, 2-octyldodecyl, triphenylmethyl, $C(O)-(CH_2)_5-C-(CH_3)^3$— (radical of neodecanoic acid), $C_{12}/C_{14}$-alkyl, phenyl, cresyl, tert-butylphenyl or benzyl group, more preferably a 2-ethylhexyl, $C(O)-(CH_2)_5-C-(CH_3)_3-$ (radical of neodecanoic acid), $C_{12}/C_{14}$-alkyl, phenyl, cresyl, tert-butylphenyl group, most preferably a tert-butylphenyl or 2-ethylhexyl group,
and where for UR
UR independently at each occurrence are identical or different divalent radicals of the form
—U-$D^C$-U—, where $D^C$ independently at each occurrence is a divalent substituted or unsubstituted, linear or branched, saturated or unsaturated hydrocarbyl radical having 1 to 30 carbon atoms, $D^C$ preferably being an isophorone radical, especially as specified in formula (VIII),
since alkoxysilyl-modified polymers of this kind, containing the polyether fragments D joined to these polyether fragments M, have particularly advantageous performance properties.

EP 2093244 describes how alkoxysilanes bearing epoxide functions can be selectively alkoxylated advantageously in the presence of known double metal cyanide catalysts. With the process claimed therein, to which reference is hereby made, the possibility is provided of performing in a reproducible manner the single and/or multiple alkoxysilyl group modification of polyoxyalkylene compounds not only terminally but also within the sequence of oxyalkylene units. The disclosure of EP 2093244, the contents of which are referred to especially with regard to the structures and processes disclosed therein, should be regarded entirely as part and parcel of this description.

The alkoxysilyl-modified polymers of the invention are preferably obtainable by means of a process comprising the steps of
(1) reacting at least one dihydroxy-functional starter (A) selected from the group of the alcohols or polyetherols with at least one alkylene oxide and at least one epoxide bearing alkoxysilyl groups,
(2) reacting at least one monohydroxy-functional starter (B) selected from the group of the alcohols or polyetherols with at least one alkylene oxide and at least one epoxide bearing alkoxysilyl groups, and (3) reacting the products from process steps (1) and (2) with at least one diisocyanate and optionally further reactants.

The OH-functional alkoxysilyl-modified alkoxylation products obtained in process steps (1) and (2) can be reacted in process step (3), preferably with diisocyanates to give the inventive alkoxysilyl-modified polymers of formula (I).

Process steps (1) and (2) can be conducted in any sequence.

In order to obtain particularly advantageous alkoxysilyl-modified polymers, it is preferable to conduct process step (3) in two stages, in the first stage (3a) the alkoxylation product H-D-H from process step (1) is first reacted with a diisocyanate so as to form an NCO-functional intermediate, which is then reacted in the second stage (3b) with the monohydroxy-functional alkoxylation product H-M from process step (2) to give the final polymer.

In such a reaction of the terminal α,ω—OH groups of the alkoxylation products from process step (I) H-D-H with 1 mol of diisocyanate per mole of OH, there is a reaction, in a formal sense, of one isocyanate group of the diisocyanate with an OH group, and the second isocyanate group remains unreacted in the reaction mixture until a further OH group is provided, preferably in the form of a monohydroxy-functional component H-M from process step (2), for NCO depletion. However, the reaction of a diol component with two moles of diisocyanate is not 100% selective, and so, as is known to those skilled in the art, by-products obtained are always reaction products where, for example, two or more diols are joined via one or more diisocyanates (for example OCN-$D^C$-UR-D-UR-D-UR-$D^C$-NCO). The formation of such by-products can be influenced by many factors, for example the stoichiometries of the individual co-reactants, the type and amount of the catalyst, temperature control, etc., but cannot be avoided entirely. The same applies to further side reactions as well (e.g. addition of an isocyanate group onto a urethane unit to give the allophanate group).

Examples of alkylene oxide compounds which can be used and which lead to the fragments with the index b specified in the formulae (Ia) and (II), are ethylene oxide, 1,2-epoxypropane (propylene oxide), 1,2-epoxy-2-methylpropane (isobutylene oxide), epichlorohydrin, 2,3-epoxy-1-propanol, 1,2-epoxybutane (butylene oxide), 2,3-epoxybutane, 2,3-dimethyl-2,3-epoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, vinylcyclohexene oxide, (2,3-epoxypropyl)benzene, vinyloxirane, 3-phenoxy-1,2-epoxypropane, 2,3-epoxy methyl ether, 2,3-epoxy ethyl ether, 2,3-epoxy isopropyl ether, stearate, 4,5-epoxypentyl acetate, 2,3-epoxypropane methacrylate, 2,3-epoxypropane acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)-1,2-epoxypropane, 3-(perfluoroethyl)-1,2-epoxypropane, 3-(perfluorobutyl)-1,2-epoxypropane, 3-(perfluorohexyl)-1,2-epoxypropane, 4-(2,3-epoxypropylmorpholine, 1-(oxiran-2-ylmethyl)pyrrolidin-2-one. Preference is given to using ethylene oxide, propylene oxide and butylene oxide. Particular preference is given to using ethylene oxide and propylene oxide.

A non-exhaustive collection of lactones which lead via ring opening to the fragments with the index d, specified in the formulae (Ia) and (II), are valerolactones or caprolactones, both of which may be unsubstituted or substituted by alkyl groups, preferably methyl groups. Preference is given to using ε-caprolactone or δ-valerolactone, especially ε-caprolactone.

Saturated, unsaturated or aromatic cyclic dicarboxylic anhydrides used, leading to the fragments with the index y through reactive incorporation, are preferably succinic anhydride, oct(en)yl-, dec(en)yl- and dodec(en)ylsuccinic anhydride, maleic anhydride, itaconic anhydride, phthalic anhydride, hexahydro-, tetrahydro-, dihydro-, methylhexahydro- and methyltetrahydrophthalic anhydride. During the alkoxylation process, the respective anhydride monomers may be copolymerized in any order and in any variable amount, successively or simultaneously in parallel with the epoxide feed, with ring opening, to form polyether esters. Mixtures of the stated anhydrides can also be used. It is possible, furthermore, to add the anhydrides to the starter $D^X$ before the beginning of reaction, and to forgo a metered addition as described above. An alternative possibility, however, is both to add the anhydrides to the starter $D^X$ and to meter in further anhydride in the course of the further reaction, during the alkoxylation.

Particularly preferred for use are succinic anhydride, maleic anhydride, phthalic anhydride and hexahydrophthalic anhydride, especially maleic anhydride and hexahydrophthalic anhydride.

Glycidyl ethers which lead to the fragments with the index c, specified in the formulae (Ia) and (II), are preferably compounds of the general formula (IV)

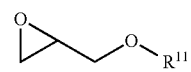

Formula (IV)

with $R^{11}$ as defined above.

$R^{11}$ is preferably a methyl, ethyl, isobutyl, tert-butyl, hexyl, octyl, 2-ethylhexyl, C(O)—(CH$_2$)$_5$—C—(CH$_3$)$_3$ (radical from neodecanoic acid, available for example as Cardura E 10 P from Momentive), $C_{12}/C_{14}$, phenyl, cresyl or tert-butylphenyl group and/or an allyl group, more preferably an allyl, cresyl, 2-ethylhexyl, —C(O)—(CH$_2$)$_5$—C—(CH$_3$)$_3$ or $C_{12}/C_{14}$ group. Employed with particular preference are 2-ethylhexyl glycidyl ether (available for example as Grilonit RV 1807, Grilonit RV 1807 4.1 or IPOX RD 17) and $C_{12}$-$C_{14}$-glycidyl ether (available for example as Ipox® RD 24).

Depending on the epoxide-functional alkoxysilane used and on any further monomers employed, modified alkoxylation products of formula (I) can be prepared, and also mixtures of any desired construction.

Alkylene oxide compounds which may be used and which lead to the fragments with the index a, specified in the formulae (Ia) and (II), may preferably conform to the general formula (V)

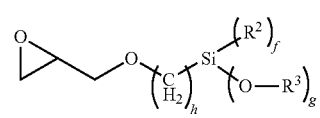

Formula (V)

where f, g, h, $R^2$ and $R^3$ are as defined above.

A non-exhaustive collection of alkoxysilanes with epoxide groups substitution, of formula (V), encompasses, for example, 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidloxypropyl)dimethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane.

Compounds of the formula (V) used with preference in the process of the invention are 3-glycidyloxypropyltrimethoxysilane or triethoxysilane, which are available, for example, under the trade names DYNASYLAN® GLYMO and DYNASYLAN® GLYEO respectively (trademarks of Evonik Degussa GmhH). Particularly preferred is the use of glycidyloxypropyltriethoxysilane, since in this way it is possible to prevent emissions of methanol in application as moisture-crosslinking components.

The compounds which can be used as starter (B) and correspond to the $R^1$ radical of the formula (Ia) are understood in the context of the present invention to mean substances which can be the end group of the final alkoxysilyl-modified polymer.

The radical $R^1$ originates preferably from a compound that contains hydroxyl groups and is of the formula (VI)

$R^1$—H  Formula (VI)

with $R^1=R^x$—O— and $R^x$=organic radical which can optionally have one or more alkoxysilyl groups, and in which the hydrogen shown in formula (VI) is thus part of the hydroxyl group. Preference is given to using compounds having molar masses of 31 to 10 000 g/mol, more preferably 50 to 2000 g/mol, more particularly 60 to 200 g/mol These compounds can be used in any desired mixtures with one another or as pure substances. It is also possible to use hydroxyl compounds having pendant substitution by substituents containing alkoxysilyl groups, or having direct substitution by alkoxysilyl groups, such as in particular the silyl polyethers described in EP 2093244, as starter compounds.

The compound of the formula (VI) used in the process of the invention is preferably selected from the group of alcohols, polyethers or phenols. It is advantageous to use low molecular mass polyetherols having molar masses of 50 to 2000 g/mol, which have in turn been prepared beforehand either by alkali-catalysed or DMC-catalysed alkoxylation.

As well as compounds with aliphatic and cycloaliphatic OH groups, any desired compounds with OH functions are suitable. These include, for example, phenol, alkylphenols and arylphenols.

Starters (A) used with preference are compounds having molar masses of 62 to 10 000 g/mol, preferably 92 to 7000 g/mol, more preferably 122 to 5000 g/mol and very preferably 2000 to 4000 g/mol. The starter compounds can be used in any desired mixtures with one another or as pure substances. It is also possible to use hydroxyl compounds having pendant substitution by substituents containing alkoxysilyl groups, or having direct substitution by alkoxysilyl groups, such as the silyl polyethers described in EP 2093244 in particular, as starter compounds. Starter compounds used advantageously are low molecular mass polyetherols having molar masses of 62 to 4000 g/mol, which have in turn been prepared beforehand by DMC-catalysed alkoxylation.

As well as compounds with aliphatic and cycloaliphatic OH groups, any desired compounds with OH functions are suitable. These include, for example, bisphenols, for example bisphenol A, as starter compounds.

The mean molar masses $M_w$ of the alkoxylation products H-D-H from process step (1) are preferably between 2000 and 25 000 g/mol, preferably between 4000 and 20 000 g/mol and more preferably from 6000 to 15 000 g/mol. Preferably, the alkoxylation products H-D-H from process step (1) are liquid at room temperature.

The mean molar masses $M_w$ of the alkoxylation products H-M from process step (2) are preferably between 500 and 15 000 g/mol, preferably between 1000 and 10 000 g/mol and more preferably from 1500 to 5000 g/mol. Preferably, the alkoxylation products H-M from process step (2) are liquid at room temperature.

The hydrophilicity/hydrophobicity of the moieties M and D in the alkoxylation products of the invention may be adjusted through the choice of suitable starter molecules and/or of suitable comonomers for the alkoxylation.

It is a feature of the alkoxylsilyl-modified polymers of the formula (I) that, in terms of structural make-up and molar mass, they can be produced in a controlled and reproducible way. The sequence of the monomer units may be varied within wide limits. Epoxide monomers may be incorporated in arbitrarily blocklike fashion arrayed with one another or statistically into the polymer chain. The sequence of the fragments inserted into the resultant polymer chain through the ring-opening reaction of the reaction components is freely permutable among the fragments, in the sense of a possibility for arrangement in any desired order, with the restriction that cyclic anhydrides and also carbon dioxide are inserted statistically, in other words not in homologous blocks, in the polyether structure, and also not directly adjacent to one another.

The index numbers reproduced here and the value ranges for the indices indicated in the formulae shown here are therefore understood as average values of the possible statistical distribution of the structures and/or mixtures thereof that are actually present. This applies even to those structural formulae which as such, per se, are reproduced exactly, such as for formula (Ia) and/or (II), for example.

Depending on the epoxide-functional alkoxysilane used and any further monomers employed, and also any carbon dioxide, it is possible to obtain ester-modified or carbonate-modified alkoxysilyl polyethers. The alkoxysilyl unit in the compound of the formulae (Ia) and (II) is preferably a trialkoxysilyl unit, more particularly triethoxysilyl unit.

As shown by $^{29}$Si NMR and GPC investigations, the process-related presence of chain-end OH groups means that transesterification reactions on the silicon atom are possible not only during the DMC-catalysed preparation but also, for example, in a subsequent process step. In that case, formally, the alkyl radical $R^3$ bonded to the silicon via an oxygen atom is replaced by a long-chain, modified alkoxysilyl polymer radical. Bimodal and multimodal GPC plots demonstrate that the alkoxylation products include not only the untransesterified species, as shown in formula (I), but also those with twice, in some cases three times, or even four times the molar mass.

The alkoxylation products therefore constitute mixtures, which may also include compounds in which the SUM of the indices f+g in the formulae (Ia) and (II) is on average less than 3, since some of the OR groups may be replaced by silyl polyether groups. The compositions therefore comprise species which are formed on the silicon atom with elimination of $R^3$—OH and condensation reaction with the reactive OH group of a further molecule of the formulae (Ia) and/or (II). This reaction may proceed repeatedly until, for example, all of the $R^3$O groups on the silicon have been replaced by further molecules of the formulae (Ia) and/or (II). The presence of more than one signal in typical $^{29}$Si NMR spectra for these compounds underlines the occurrence of silyl groups with different substitution patterns.

The stated values and preference ranges for the indices a, b, c, d, e, g, h, i, j, t, u, v, w and y in the compounds of the formulae (I), (Ia) and (II) should therefore be understood as average values across the various, individually intangible species. The diversity of chemical structures and molar masses is also reflected in the broad molar mass distributions of $M_w/M_n$ of mostly ≥1.5, which are typical for alkoxysilyl-modified polymers of the formula (I) and entirely unusual for conventional DMC-based polyethers.

Inseparably connected with the process for alkoxylation of epoxy-functional alkoxysilanes that is set out in EP 2 093 244 is the feature that on the chain terminus or on the chain termini there is always an OH functionality, originating from the epoxide ring opening of the last respective epoxide monomer, with attachment to the OH-functional end of the growing chain.

The products of the invention can be prepared in a variety of ways, in particular by processes which follow the processes described in EP 2 093 244, EP 2415796 (US 2012/028022) or EP 2415797 (US 2012/029090). The alkoxylation products of the invention are preferably prepared by the process of the invention as described below.

The preferred process of the invention for preparation of such polymers comprises the steps of
  (1) reacting at least one dihydroxy-functional starter (A) selected from the group of the alcohols or polyetherols with at least one alkylene oxide and at least one epoxide bearing alkoxysilyl groups,
  (2) reacting at least one monohydroxy-functional starter (B) selected from the group of the alcohols or polyetherols with at least one alkylene oxide and at least one epoxide bearing alkoxysilyl groups, and
  (3) reacting the products from process steps (1) and (2) with at least one diisocyanate and optionally further reactants.

The preferred configuration of process step (1) is described hereinafter:

In process step (1), a DMC-catalysed alkoxylation of a starter (A) with compounds having epoxy groups (alkylene oxides and glycidyl ethers) is conducted.

In order to start the alkoxylation reaction according to the process of the invention, the starting mixture, consisting of one or more starters (A) and the double metal cyanide catalyst, which optionally has been suspended beforehand in a suspension medium, is charged to the reactor.

Suspension media utilized may be either a polyether or inert solvents or else, advantageously, one or more starting compounds, or alternatively a mixture of both components.

Propylene oxide or at least one other epoxide compound is metered into the starting mixture introduced. To start the alkoxylation reaction and to activate the double metal cyanide catalyst, generally only some of the total amount of epoxide to be metered in is initially added. The molar ratio of epoxide to the reactive groups in the starter, more particularly to the OH groups in the starting mixture, is in the starting phase preferably between 0.1:1 to 10:1, preferably between 0.2:1 to 5:1, preferably between 0.4:1 to 3:1. It may be advantageous if, before the epoxide is added, any reaction-inhibiting substances that may be present are removed from the reaction mixture, by means of distillation, for example, optionally under reduced pressure.

The start of the exothermic reaction may be detected by monitoring pressure and/or temperature for example. In the case of gaseous alkylene oxides, a sudden drop in pressure in the reactor indicates that the alkylene oxide is being incorporated, that the reaction has thus started and that the end of the start phase has been reached. In the case of non-gaseous glycidyl ethers/esters or epoxy-functional alkoxysilanes, the onset of the reaction is indicated by the enthalpy change which occurs.

After the start phase, i.e. after initialization of the reaction, further alkylene oxide is metered in depending on the molar mass sought. An alternative possibility is to add on an arbitrary mixture of different alkylene oxide compounds and compounds of the formulae (IV) and (V), which may also be added on separately in any order in succession.

The reaction may be performed in an inert solvent, for example to reduce the viscosity of the reaction mixture. Suitable inert solvents include hydrocarbons, especially toluene, xylene or cyclohexane. However, this is less preferred.

In the products of the invention, the molar ratio of the sum of the metered epoxides, including the epoxides already added in the starting phase, based on the starting compound employed, more particularly based on the number of OH groups in the starting compound employed, is preferably 1 to $10^5$:1, more particularly 1 to $10^4$:1.

The addition of the alkylene oxide compounds occurs preferably at a temperature of 60 to 250° C., more preferably at a temperature of 90 to 160° C. The pressure at which the alkoxylation takes place is preferably 0.02 bar to 100 bar, more preferably 0.05 to 20 bar and more particularly from 0.2 to 2 bar absolute. By carrying out the alkoxylation at sub-atmospheric pressure it is possible to implement the reaction very safely. The alkoxylation may optionally be carried out in the presence of an inert gas (e.g. nitrogen) or—for producing polyethercarbonates—in the presence of carbon dioxide in this case also at a positive pressure of from preferably 1 to 20 bar absolute.

The cyclic anhydrides or lactones, which can be used for the preparation of ester-modified poly ethers, may be added not only in the actual starting phase to the mixture of starter (A) and catalyst, but also at a later point in time, in parallel with the alkylene oxide feed. The comonomers mentioned can also each be metered into the reactor in alternating succession with alkylene oxides.

Here, the molar ratio of the alkylene oxide monomers to cyclic anhydrides may be varied. Based on anhydrides, at least equimolar amounts of alkylene oxide monomers are typically employed. Preference is given to using the alkylene oxides in a molar excess in order to ensure full anhydride conversion.

Lactones may be added during the alkoxylation either in stoichiometric deficiency or excess based on the alkylene oxide monomers.

After the monomer addition and any further reaction to complete the monomer conversion, any residues of unreacted monomer and any further volatile constituents are removed, typically by vacuum distillation, gas stripping or other deodorization methods. Volatile secondary components may be removed either discontinuously (batchwise) or continuously. In the DMC catalysis-based process of the invention, filtration may normally be eschewed.

The process steps may be performed at identical or different temperatures. The mixture of starting substance, DMC catalyst and optionally suspension medium that is charged to the reactor at the start of the reaction may be pretreated by stripping in accordance with the teaching of WO 98/52689 before monomer metering is commenced. This comprises admixing an inert gas with the reaction mixture via the reactor feed and removing relatively volatile components from the reaction mixture by application of negative pressure using a vacuum plant connected to the reactor system. In this simple fashion, substances which may inhibit the catalyst, such as lower alcohols or water for example, can be removed from the reaction mixture. The addition of inert gas and the simultaneous removal of the relatively volatile components may be advantageous particularly at reaction start-up, since the addition of the reactants, or secondary reactions, may also introduce inhibiting compounds into the reaction mixture.

Double metal cyanide catalysts (DMC catalysts) used in the process of the invention are preferably those described in EP 2 093 244, more particularly the DMC catalysts described therein as preferred and particularly preferred, respectively.

The catalyst concentration in the reaction mixture is preferably from >0 to 1000 wppm (mass ppm), preferably from >0 to 500 wppm, more preferably from 0.1 to 300 wppm and most preferably from 1 to 200 wppm. This concentration is based on the total mass of the alkoxylation products formed.

The catalyst is preferably metered into the reactor only once. The amount of catalyst is to be set such that sufficient catalytic activity is provided for the process. The catalyst may be metered in in solid form or in the form of a catalyst suspension. If a suspension is used, then a particularly suitable suspension medium is the starter. Preferably, however, there is no suspending.

It may be advantageous if process step (1) of the process of the invention is carried out such that the alkoxylation is carried out in at least three stages. In stage (1a), the starter (A) is reacted with a small amount of propylene oxide in the presence of the DMC catalyst as described above. Subsequently, further propylene oxide is added on until the desired molar mass is attained.

In stage (1b), further propylene oxide and/or ethylene oxide and optionally one or more of the abovementioned glycidyl ethers of the formula (IV) are added; in stage (1c), one or more of the compounds of the formula (V) is or are added, optionally with further addition of propylene oxide and/or ethylene oxide; stages 2 and 3 may also be combined to form one stage.

By adding on a mixture of compound of the formula (V) and propylene oxide in stage (1c), the alkoxysilane functionality is introduced randomly over the polymer chains/polymer blocks. The sequence in which stages (1b) and (0.1c) are carried out is arbitrary. Preferably, after stage (1a), stage (1b) is carried out first, before stage (1c) is carried out. Stages (1b) and (1c) may be carried out repeatedly in succession. If stages (1b) and (1c) are carried out a number of times, the alkylene oxides used, and also the components of the formulae (IV) and (V), may be the same or different. The detailed process description above serves merely for better illustration, and represents a preferred metering sequence of the reactants. It must not be used to imply any strictly blockwise construction of the alkoxysilyl-modified polymers of the invention.

Stage (1a) is carried out preferably at a temperature of 70-160° C., more preferably at 80-150° C., very preferably at a temperature of 100-145° C., especially preferably at 110-130° C. Stage (1b) is carried out preferably at a temperature of 70-160° C., more preferably at 80-150° C., very preferably at a temperature of 100-145° C., especially preferably at 110-130° C. Stage (1c) is carried out preferably at a temperature of 70-140° C. more preferably at 75-120° C., very preferably at a temperature of 80-110° C. If stages (1b) and (1c) are combined, the reaction temperature should be adapted to the temperature preferred under stage (1c).

Monomers are used in process step (1) preferably in the following fractions: 10 to 99.9 wt %, preferably 30 to 99 wt %, especially preferably 40 to 98 wt % of propylene oxide, 0 to 60 wt %, preferably 3 to 40 wt %, especially preferably 0 to 20 wt % of ethylene oxide, 0.1 to 15 wt %, preferably 0.5 to 10 wt %, especially preferably 1 to 7 wt % of epoxide bearing alkoxysilyl groups, and 0 to 25 wt %, preferably 0.1 to 20 wt %, especially preferably 0 to 10 wt % of further monomers, preferably selected from alkylene oxides other than propylene oxide and ethylene oxide, such as butylene oxide, isobutylene oxide, styrene oxide, and/or further comonomers such as ε-caprolactone, phthalic anhydride, glycidyl ethers such as tert-butylphenyl glycidyl ether, $C_{12}$/$C_{14}$ fatty alcohol glycidyl ethers and 2-ethylhexyl glycidyl ether, based on the total weight of the monomers used.

The above remarks related to the preferred configuration of process step (1). Described hereinafter is the preferred configuration of process step (2):

Process step (2) is conducted analogously to the above-described process step (1), with the sole difference that starter (B) is used rather than starter (A).

Monomers are used in process step (2) preferably in the following fractions: 10 to 97 wt %, preferably 30 to 95 wt %, especially preferably 50 to 90 wt % of propylene oxide, 0 to 60 wt %, preferably 3 to 40 wt %, especially preferably 0 to 20 wt % of ethylene oxide, 1 to 30 wt %, preferably 3 to 25 wt %, especially preferably 7 to 20 wt % of epoxide bearing alkoxysilyl groups, and 0 to 25 wt %, preferably 0.1 to 20 wt %, especially preferably 0 to 10 wt % of further monomers, preferably selected from alkylene oxides other than propylene oxide and ethylene oxide, such as butylene oxide, isobutylene oxide, styrene oxide, and/or further comonomers such as ε-caprolactone, phthalic anhydride, glycidyl ethers such as tert-butylphenyl glycidyl ether, $C_{12}$/$C_{14}$ fatty alcohol glycidyl ethers and 2-ethylhexyl glycidyl ether, based on the total weight of the monomers used.

Preferred configuration of process step (3):

The OH-functional alkoxysilyl-modified alkoxylation products obtained in process steps (1) and (2) can be converted in process step (3), preferably reacted with diisocyanates to give the inventive alkoxysilyl-modified polymers, especially of formula (I).

In a particularly preferred embodiment of the process, process step (3) is conducted in two stages. In the first stage (3a) the alkoxylation product H-D-H from process step (1) is first reacted with a diisocyanate so as to form an NCO-functional intermediate, which is then reacted in the second stage (3b) with the monohydroxy-functional alkoxylation product H-M from process step (2) to give the final polymer.

Preferably, in process step (3) of the process of the invention, the diisocyanates are used in a molar excess relative to the OH groups of the polyethers from process step (1) H-D-H and, in addition, the polyethers from process step (2) H-M are used in a molar excess relative to the isocyanates present in the reaction mixture.

In a particularly preferred embodiment of the process of the invention, in process step (3), the reactants are used in such a way that equimolar ratios of isocyanate groups in the diisocyanates used and the totality of OH groups in the polyethers from process steps (1) and (2) (H-D-H+H-M) are reacted.

In a further particularly preferred embodiment of the process of the invention, in process step (3b), mixtures of compounds H-M consisting of alkoxylation products from process step (2) and compounds H-M bearing no alkoxysilyl functions are used.

The stoichiometric ratios of OH group to isocyanate groups chosen in stage (3a) determine the number of UR fragments in the final product.

In stage (3b), the unreactive isocyanate groups are preferentially reacted with molecules H-M. The reaction with the molecule H-M corresponds to an end-capping process. The aim with this reaction step is to cause preferably all of the isocyanate groups to be consumed by reaction.

Process step (3) of the process of the invention for preparing alkoxysilyl-modified polymers of formula (I) is carried out preferably with isophorone diisocyanate in the presence of a transition metal catalyst, and is described in detail in German patent application DE 102012203737 A1. In principle, however, all known diisocyanates are suitable as compounds containing isocyanate groups. Within the context of the teaching of the invention, preference is given, for example, to aromatic, aliphatic and cycloaliphatic diisocyanates having a number-average molar mass of below 800 g/mol. Examples usable advantageously include diisocyanates from the group of toluene 2,4-/2,6-diisocyanate (TDI), methyldiphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanatodicyclohexylpropane(2,2), 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI), and mixtures consisting of these compounds.

Preferred diisocyanates used for the preparation of the alkoxylsilyl-modified polymers of formula (I) may be hexamethylene diisocyanate (HDI), isophorone diisocyanate (IPDI) and/or 4,4'-diisocyanatodicyclohexylmethane in particular, isophorone diisocyanate (IPDI) may preferably be used.

The exact structure of isophorone diisocyanate is shown in formula (VII).

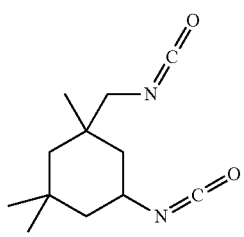

Formula (VII)

Thus, after the reaction of the isophorone diisocyanate, in a particularly preferred execution of process step (3) of the process of the invention, the isophorone fragment $D^C$ shown in formula (VIII) is obtained in the final alkoxysilyl-modified polymer.

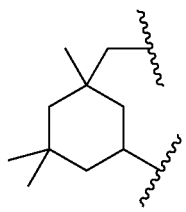

Formula (VIII)

The documents EP 2415797 (US 2012/029090), the disclosure content of which is hereby referred to, especially with regard to the structures and processes disclosed therein, and especially the processes disclosed therein, should hereby be considered in full to form part of this description.

It may be advantageous if process step (3) is carried out such that >40 wt %, preferably >60 wt % and more preferably >85 wt % of the alkoxysilyl-modified polymers of formula (I) obtained no longer have a free OH group.

The alkoxysilyl-codified polymers of the invention may be used, for example, for producing curable compositions.

It is a feature of curable compositions of the invention that they comprise one or more of the above-described inventive alkoxysilyl-modified polymers of the formula (I) and at least one curing catalyst.

It may be advantageous if the curable compositions of the invention comprise only alkoxysilyl-modified polymers of the formula (I) with i=2, j=1 to 4, u=(j+1) and v=0 to 4 as defined above, and no alkoxylation products of the formula (I) in which i=0, j=1, u=0 and v=0.

It may also be advantageous if the curable compositions of the invention comprise, as well as alkoxysilyl-modified polymers of the formula (I) with i=2, j=1 to 4, u=(j+1) and v=0 to 4 as defined above, also those alkoxylation products of the formula (I) in which i=0, j=1, u=0 and v=0. Where both kinds of alkoxysilyl-modified polymers or alkoxylation products are present in the curable compositions of the invention, the mass ratio (ratio of the parts by mass) of alkoxysilyl-modified polymers of the formula (I) with i=1 to 2, j=1 to 4, u=(j+1) and v=0 to 4 to alkoxylation products of the formula (I) in which i=0, j=1, u=0 and v=0 is from 100:>0 to 10:90, preferably between 95:5 and 15:85 and more preferably between 80:20 and 30:70. Preferably, the alkoxylation products of the formula (I) in which i=0, j=1, u=0 and v=0 also have ethoxysilyl groups, preferably triethoxysilyl groups, predominantly or exclusively, preferably exclusively, as their alkoxysilyl groups.

The fraction of the alkoxysilyl-modified polymers of the invention in the curable compositions of the invention is preferably from 10 to less than 90 wt %, preferably from 15 to 70 wt % and more preferably from 20 wt % to 65 wt %.

Curing catalysts used (for the crosslinking or polymerization of the composition of the invention or for the chemical attachment thereof to particle surfaces or macroscopic surfaces) may be the catalysts typically employed for the hydrolysis and condensation of alkoxysilanes. Curing catalysts employed with preference are organotin compounds, such as, for example, dibutyltin dilaurate, dibutyltin diacetylacetonate, dibutyltin diacetate, dibutyltin diacetate, or dioctyltin dilaurate, dioctyltin diacetylacetonate, dioctyltin diketanoate, dioctylstannoxane, dioctyltin dicarboxylate, dioctyltin oxide, preferably dioctyltin diacetylacetonate, dioctyltin dilaurate, dioctyltin diketanoate, dioctylstannoxane, dioctyltin dicarboxylate, di octyltin oxide, more preferably dioctyltin diacetylacetonate and dioctyltin dilaurate.

Also used, furthermore, may be zinc salts, such as zinc octoate, zinc acetylacetonate and zinc-2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference to that of zinc octoate. Use may further be made of bismuth catalysts as well. e.g. Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds such as calcium disodium ethylenediamine tetraacetate or calcium diacetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine etc. Organic or inorganic Bronsted acids as well, such as acetic acid, trifluoroacetic acid, methanesulphonic acid, p-toluenesulphonic acid or benzoyl chloride, hydrochloric acid, phosphoric acid, its monoesters and/or diesters, such as butyl phosphate, (iso)propyl phosphate, dibutyl phosphate, etc., for example, are suitable as catalysts. It is of course also possible to employ combinations of two or more catalysts.

The fraction of the curing catalysts in the composition of the invention is preferably from 0.1 wt % to 5 wt %, more preferably from 0.15 to 2 wt % and very preferably from 0.2 to 0.75 wt %, based on the overall composition.

The composition of the invention may comprise further adjuvants selected from the group of plasticizers, fillers, solvents, adhesion promoters, additives for modifying the flow behaviour, known as rheology additives, and drying agents, more particularly chemical moisture-drying agents.

The composition of the invention preferably comprises one or more adhesion promoters and/or one or more drying agents, more particularly chemical moisture-drying agents.

As adhesion promoters it is possible for the adhesion promoters known from the prior art, more particularly aminosilanes to be present in the composition of the invention. Adhesion promoters which can be used are preferably compounds which bear alkoxysilyl groups and which additionally possess primary or secondary amine groups, vinyl groups, thiol groups, aryl groups or alternatively oxirane groups, such as 3-aminopropyltrimethoxysilane (Dynasylan®) AMMO (Evonik)), N-(2-aminoethyl)-3-aminopropyltrimethoxysilane (Dynasylan® DAMO (Evonik)), N-(n-butyl)aminopropyltrimethoxysilane (Dynasylan® 1189 (Evonik)), 3-mercaptopropyltrimethoxysilane (Dynasylan® MTMO, Evonik), 3-glycidyloxypropyltriethoxysilane (Dynasylan® GLYEO, Evonik) 3-glycidyloxypropyltrimethoxysilane (Dynasylan® GLYMO, Evonik), phenyltrimethoxysilane (Dynasylan® 9165 or Dynasylan® 9265, Evonik) or oligomeric amino/alkyl-alkoxysilanes such as, for example, Dynasylan® 1146 (Evonik), in each case alone or in a mixture. Adhesion promoters preferably present are, for example, 3-aminopropyltriethoxysilane (Geniosil® GF 93 (Wacker), Dynasylan® AMEO (Evonik®)) and/or (3-aminopropyl)methyldiethoxysilane (Dynasylan® 1505 (Evonik®)), 3-aminopropyltrimethoxysilane (Dynasylan® AMMO (Evonik)), N-(2-aminoethyl)-3-aminopropyltrimethoxysilane (Dynasylan® DAMO (Evonik)), Dynasylan® 1146 (Evonik), more preferably 3-aminopropyltriethoxysilane, 3-aminopropyltrimethoxysilane, N-(2-aminoethyl)-3-aminopropyltrimethoxysilane, Dynasylan® 1146, and especially preferably 3-aminopropyltrimethoxysilane, 3-aminopropyltriethoxysilane, N-(2-aminoethyl)-3-aminopropyltrimethoxysilane and Dynasylan® 1146.

The fraction of the adhesion promoters in the composition of the invention is preferably from greater than 0 to 5 wt %, more preferably from 0.5 to 4 wt % and very preferably from 1 to 2.5 wt %, based on the overall composition.

It may be advantageous if the composition of the invention comprises a drying agent, in order, for example to bind moisture or water introduced by formulation components, or incorporated subsequently by the filling operation or by storage. Drying agents Which can be used in the compositions of the invention are in principle all of the drying agents known from the prior art. Chemical drying agents which can be used include, for example, vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker), vinyltriacetoxysilane (Geniosil® GF 62, Wacker), N-trimethoxysilylmethyl O-methylcarbamate (Geniosil® XL 63, Wacker), N-dimethoxy(methyl)silylmethyl O-methylcarbamate, N-methyl[3-(trimethoxysilyl)propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis(3-trimethoxysilylpropyl)amine (Dynasylan® 1124), N-dimethoxy(methyl)silylmethyl O-methylcarbamate (Geniosil® XL 65, Wacker) or oligomeric vinylsilanes such as, for example, Dynasylan® 6490 and Dynasylan® 6498 (both acquirable from Evonik) alone or in a mixture. Preference is given to using vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker) as drying agents. As a chemical moisture-drying agent, the composition of the invention comprises preferably vinyltrimethoxysilane (Dynasylan® VTMO, Evonik or Geniosil® XL 10, Wacker AG). Furthermore, in addition to or as an alternative to the chemical drying, a physical drying agent may be used, such as zeolites, molecular sieves, anhydrous sodium sulphate or anhydrous magnesium sulphate, for example.

The fraction of the drying agent in the composition of the invention is preferably from greater than 0 to 5 wt %, more preferably from 0.2 to 3 wt %, based on the overall composition.

The composition of the invention may comprise one or more adjuvants selected from the group of plasticizers, fillers, solvents and additives for adapting the flow behaviour (rheology additives).

The plasticizers may for example be selected from the group of the phthalates, the polyesters, alkylsulphonic esters of phenol, cyclohexanedicarboxylic esters, or else of the polyethers. Plasticizers used are only those compounds which are different from the alkoxylation products of the invention of the formula (I).

If plasticizers are present in the composition of the invention, the fraction of the plasticizers in the composition of the invention is preferably from greater than 0 wt % to 90 wt %, more preferably 2 wt % to 70 wt %, very preferably 5 wt % to 50 wt %, based on the overall composition.

Fillers which can be used are, for example, precipitated or ground chalk, inorganic carbonates in general, precipitated or ground silicates, precipitated or fumed silicas, glass powders, hollow glass beads (known as bubbles), metal oxides, such as $TiO_2$, $Al_2O_3$, for example, natural or precipitated barium sulphates, reinforcing fibres, such as glass fibres or carbon fibres, long or short fibre wollastonites, cork, carbon black or graphite. With advantage it is possible to use hydrophobized fillers, since these products exhibit lower introduction of water and improve the storage stability of the formulations.

If fillers are present in the composition of the invention, the fraction of the fillers in the composition of the invention is preferably from 1 to 70 wt % based on the overall composition, with concentrations of 30 to 65 wt % being particularly preferred for the fillers stated here, with the exception of the fumed silicas. If fumed silicas are used, a particularly preferred fumed silica fraction is from 2 to 20 wt %.

As rheology additives, preferably present in addition to the filler, it is possible to select from the group of the amide waxes, acquirable for example from Cray Valley under the brand name Crayvallac®, hydrogenated vegetable oils and fats, fumed silicas, such as Aerosil® 8202 or 8805 (both acquirable from Evonik) or Cab-O-Sil® TS 720 or TS 620 or TS 630 (sold by Cabot), for example. If fumed silicas are already being used as a filler, there may be no need to add a rheology additive.

If rheology additives are present in the composition of the invention, the fraction of the rheology additives in the composition of the invention, depending on the desired flow behaviour, is preferably from greater than 0 wt % to 10 wt %, more preferably from 2 wt % to 6 wt %, based on the overall composition.

The compositions of the invention may comprise solvents. These solvents may serve, for example, to lower the viscosity of the uncrosslinked mixtures, or may promote flow onto the surface. Solvents contemplated include in principle all solvents and also solvent mixtures. Preferred examples of such solvents are ethers such as, tert-butyl methyl ether, esters, such as ethyl acetate or butyl acetate or diethyl carbonate, and also alcohols, such as methanol, ethanol and also the various regioisomers of propanol and of butanol, or else glycol types, which are selected according to the specific application. Furthermore, aromatic and/or aliphatic solvents may be employed, including halogenated solvents as well, such as dichloromethane, chloroform, carbon tetrachloride, hydrofluorocarbons (FREON), etc., and also inorganic solvents such as, for example, water, $CS_2$, supercritical $CO_2$ etc.

As and when necessary, the compositions of the invention may further comprise one or more substances selected from the group encompassing co-crosslinkers, flame retardants, deaerating agents, antimicrobial and preservative substances, dyes, colorants and pigments, frost preventatives, fungicides and/or reactive diluents and also complexing agents, spraying assistants, wetting agents, fragrances, light stabilizers, radical scavengers, UV absorbers and stabilizers, especially stabilizers against thermal and/or chemical exposures and/or exposures to ultraviolet and visible light.

UV stabilizers used may be, for example, known products based on hindered phenolic systems. Light stabilizers used may be, for example, those known as HALS amines. Examples of stabilizers which can be used are the products or product combinations known to the skilled person, comprising for example Tinuvin® stabilizers (BASF), such as Tinuvin® stabilizers (BASF), as for example Tinuvin® 1130, Tinuvin® 292 or else Tinuvin® 400, preferably Tinuvin® 1130 in combination with Tinuvin® 292. The amount in which they are used is guided by the degree of stabilization required.

In addition, the curable compositions may be admixed with co-crosslinkers in order to boost mechanical hardness and reduce the propensity to flow. Such co-crosslinkers are typically substances capable of providing 3, 4 or more crosslinkable groups. Examples in the context of this invention are 3-aminopropyltriethoxysilane, tetramethoxysilane or tetraethoxysilane.

Preferred curable compositions of the invention comprise at least one alkoxylation product of the formula (I) and a plasticizer, a filler, an adhesion promoter, a drying agent or a (curing) catalyst.

Particularly preferred compositions of the invention have from 10 to 90 wt % or less than 80 wt %, based on the overall composition, of alkoxysilyl-modified polymers of the formula (I), which preferably have an average of between 2.0 and 8.0 ethoxysilyl functions per alkoxysilyl-modified polymer of the formula (I), from 0.3 wt % to 5.0 wt %, preferably from 0.5 wt % to 4.0 wt % and more preferably from 1.0 wt % to 2.5 wt %, based on the overall composition, of adhesion promoter, less than 30 wt %, based on the overall composition, of plasticizer, from 1 to 70 wt %, based on the overall composition, of fillers, from 0.2 to 3.0 wt %, based on the overall composition, of chemical moisture-drying agents, and from 0.1 wt % to 5.00 wt %, preferably 0.2 to 3.00 wt %, based on the overall composition, of curing catalysts. In the case of especially preferred compositions, the stated fractions of the formulation ingredients are selected such that the sum total of the fractions adds up to 100 wt %.

The compositions of the invention may be, for example, adhesives or sealants, or may be used for producing an adhesive or sealant.

The composition of the invention, more particularly the composition of the invention thus obtained, cures within time periods comparable with existing commercially available and industrially employed products, and also undergoes very good depthwise crosslinking if applied in relatively thick films. The flank adhesion and attachment to different substrates, such as steel, aluminium, various plastics and mineral substrates, such as stone, concrete and mortar, for example, are particularly good.

The compositions of the invention may be used in particular for reinforcing, levelling, modifying, adhesively bonding, sealing and/or coating of substrates. Suitable substrates are, for example, particulate or sheetlike substrates, in the construction industry or in vehicle construction, structural elements, components, metals, especially construction materials such as iron, steel, including stainless steel, and cast iron, ceramic materials, especially based on solid metal oxides or non-metal oxides or carbides, aluminium oxide, magnesium oxide or calcium oxide, mineral or organic substrates, especially cork and/or wood, mineral substrates, chipboard and fibreboard made from wood or cork, composite materials such as, for example, wood composite materials such as MDF boards (medium-density fibreboard), WPC articles (wood plastic composites), chipboard, cork articles, laminated articles, ceramics, and also natural fibres and synthetic fibres (and substrates comprising them), or mixtures of different substrates. With particular preference the compositions of the invention are used in the sealing and/or coating of particulate or sheetlike substrates, in the construction industry or in vehicle construction, for the sealing and adhesive bonding of structural elements and components, and also for the coating of porous or non-porous, particulate or sheetlike substrates, for the coating or modification of surfaces and for applications on metals, particularly on construction materials such as iron, steel, including stainless steel, and cast iron, for application on ceramic materials, especially based on solid metal oxides or non-metal oxides or carbides, aluminium oxide, magnesium oxide or calcium oxide, on mineral substrates or organic substrates, especially on cork and/or wood, for the binding, reinforcement and levelling of uneven, porous or fractious substrates, such as for example, mineral substrates, for example, chipboard and fibreboard made from wood or cork, composite materials, for example wood composites such as MDF boards (medium-density fibreboard), WPC articles (wood plastic composites), chipboard, cork articles, laminated articles, ceramics, but also natural fibres and synthetic fibres, or mixtures of different substrates.

As a result of this broad spectrum of adhesion, they are also suitable for the bonding of combinations of materials comprising the substrates stated. In this context it is not critical whether the surfaces are smooth or roughened or porous. Roughened or porous surfaces are preferred, on account of the greater area of contact with the adhesive.

The compositions of the invention are applied preferably in a temperature range of 10° C.-40° C. and also cure effectively under these conditions. In view of the moisture-dependent curing mechanism, a relative atmospheric humidity of min. 35% to max, 75% is particularly preferred for effective curing. The cured adhesive bond (composition) can be used within a temperature range of −10° C. to 80° C. The adhesive bonds produced with the compositions of the invention are resistant to water at T<60° C. and to non-swelling solvents. The adhesive bond is not resistant to solvents which swell the formulation, such as methanol, ethanol, toluene, tetrahydrofuran, acetone or isopropanol, for example.

Swellability by ethanol, which is formed during the crosslinking reaction of the alkoxylation products, is a fundamental prerequisite, since the ethanol formed does not hinder curing even within large, extensive bonds. It is transported away to the edges, where it evaporates. Accordingly, rapid curing of the extensive bond is ensured with the formulations of the invention.

The use of the curable compositions of the invention, as described above, for adhesive and/or sealant applications, the use of the alkoxysilyl-modified polymers of the invention, as described above, for strengthening, levelling, modifying, adhesively bonding, sealing and/or coating substrates, and the use of the alkoxysilyl-modified polymers of the invention, as described above, in curable compositions, for improvement of tear propagation resistance, are further subject-matter of this invention.

The examples presented below illustrate the present invention by way of example, without any intention of restricting the invention, the scope of application of which is apparent from the entirety of the description and the claims, to the embodiments specified in the examples.

Having generally described this invention, a further understanding can be obtained by reference to certain specific examples which are provided herein for purposes of illustration only, and are not intended to be limiting.

EXAMPLES

General Remarks:

The viscosity was determined in a shear rate-dependent manner at 25° C. with the MCR301 rheometer from Anton Paar in a plate/plate arrangement with a gap width of 1 mm. The diameter of the upper plate was 40 mm. The viscosity at a shear rate of 10 s$^{-1}$ was read off and is set out in Tables 1 and 2.

Examples 1 to 6

Synthesis of PPG-Based Alkoxysilyl-Modified Polyethers According to Process Step (1) of the Process of the Invention A 5 liter autoclave was charged with the appropriate amount of PPG 2000 (600-900 g according to the example), and 100 ppm (based on the total batch) of a zinc hexacyanocobaltate double metal cyanide catalyst were added. The reactor was inertized by injecting nitrogen to 3 bar and then decompressing to standard pressure. This operation was repeated twice more. While stirring, the contents of the reactor were heated to 130° C. and evacuated to about 20 mbar to remove volatile components. After 30 minutes, the catalyst was activated by the metered introduction into the evacuated reactor of 80 g of propylene oxide. The internal pressure rose initially to about 0.8 bar. After a few minutes there was onset of reaction, as evident from a spontaneous drop in the reactor pressure. Then the necessary amount(s) of propylene oxide and/or ethylene oxide were metered in to achieve the structure of the 1st block specified in Table 1. This was followed by further reaction for one hour, during which the temperature was lowered to 95° C. At this temperature, a mixture of DYnasylan® GLYEO (3-glycidyloxypropyltriethoxysilane, from Evonik) and propylene oxide was then metered in continuously so as to give the structure of the second block specified in Table 1, and the temperature remained constant. After further reaction for another one hour, deodorization was carried out by application of a pressure (P<100 mbar) in order to remove residues of unreacted alkylene oxide. Then 500 ppm of Irganox® 1135 (from BASF) were stirred in for 15 minutes. All the products obtained were colourless and homogeneous. The respective molar ratios of the reactants employed, relative to 1 mol of starter, can be seen in table 1.

Examples 7 and 8

Synthesis of BPG-Based Alkoxysilyl-Modified Polyethers According to Process Step (2) of the Process of the Invention A 5 liter autoclave was charged with the appropriate amount of BPG 400 (250-500 g according to the example), and 150 ppm (based on the total batch) of a zinc hexacyanocobaltate double metal cyanide catalyst were added. The reactor was inertized by injecting nitrogen to 3 bar and then decompressing to standard pressure. This operation was repeated twice more. While stirring, the contents of the reactor were heated to 130° C. and evacuated to about 20 mbar to remove volatile components. After 30 minutes, the catalyst was activated by the metered introduction into the evacuated reactor of 80 g of propylene oxide. The internal pressure rose initially to about 0.8 bar. After a few minutes there was onset of reaction, as evident from a spontaneous drop in the reactor pressure. Then the necessary amount of propylene oxide was metered in to achieve the structure of the 1st block specified in Table 1. This was followed by further reaction for one hour, during which the temperature was lowered to 95° C. At this temperature, a mixture of Dynasylan® GLYEO 3-glycidyloxypropyltriethoxysilane, from Evonik) and propylene oxide was then metered in continuously so as to give the structure of the second block specified in Table 1, and the temperature remained constant. After further reaction for another one hour, deodorization was carried out by application of a pressure (P<100 mbar) in order to remove residues of unreacted alkylene oxide. Then 500 ppm of Irganox® 1135 (from BASF) were stirred in for 15 minutes. All the products obtained were colourless, homogeneous and of low viscosity. The respective molar ratios of the reactants employed, relative to 1 mol of starter, together with the viscosities, can be seen in table 1.

TABLE 1

Structure and viscosity of the alkoxysilyl polyethers of Examples 1-8

| | 1st block | | 2nd block | | Viscosity |
|---|---|---|---|---|---|
| Ex. | Structure Starter | n [mol] | $n_{GLYEO}$ [mol] | $n_{PO}$ [mol] | [Pa · s] (at 25° C.) |
| 1 | PPG 2000* | 70 PO | 0 | 103 | 11.6 |
| 2 | PPG 2000* | 70 PO | 1 | 102 | 11.3 |
| 3 | PPG 2000* | 70 PO | 2 | 101 | 10.5 |
| 4 | PPG 2000* | 70 PO | 2.5 | 100.5 | 9.5 |
| 5 | PPG 2000* | 15 PO + 20 EO/35 PO | 2 | 101 | 11.1 |
| 6 | Desmophen C 2100+ | 87 PO | 1 | 102 | 65.8 |
| 7 | BPG 400** | 11 | 1.5 | 20 | 0.27 |
| 8 | BPG 400** | 15 | 1.5 | 62 | 0.89 |

*polypropylene glycol polyether with an average molecular weight of 2000 g/mol
**butanol-started polypropylene glycol with an average molar mass of 400 g/mol
+terminally dihydroxy-functional polycarbonate with an average molecular weight of 2000 g/mol (available from Bayer Material Science)

Synthesis of Alkoxysilyl-Modified Polymers According to Process Step (3) of the Process of the Invention (End-Capping According to DE 102012203737A1):

The alkoxylation products prepared in Examples 1-6 were subsequently reacted with IPDI (isophorone diisocyanate) and the alkoxylation products prepared from Examples 7 and 8 according to process step (3) of the invention.

Example 9 (Comparative Example)

1082 g of alkoxysilyl polyether from Example 1 were introduced and heated to 70° C. Then 36.9 g of IPDI were added, the mixture was stirred for five minutes, and 0.09 g of TIB Kat 216 (dioctyltin dilaurate) was added. The mixture was stirred for 30 min, and 452.9 g of an alkoxysilyl polyether from Example 7 were added. This was followed by stirring for a further 5 hours.

Example 10

2389.9 g of alkoxysilyl polyether from Example 2 were introduced and heated to 70° C. Then 80.5 g of IPDI were added, the mixture was stirred for five minutes, and 0.20 g of TIB Kat 216 (dioctyltin dilaurate) was added. The mixture was stirred for 30 min, and 987.9 g of an alkoxysilyl polyether from Example 7 were added. This was followed by stirring for a further 5 hours.

Example 11

2293.9 g of alkoxysilyl polyether from Example 3 were introduced and heated to 70° C. Then 76.28 g of IPDI were added, the mixture was stirred for five minutes, and 0.20 g of TIB Kat 216 (dioctyltin dilaurate) was added. The mixture was stirred for 30 min, and 935.9 g of an alkoxysilyl polyether from Example 7 were added. This was followed by stirring for a further 5 hours.

Example 12

993.6 g of alkoxysilyl polyether from Example 4 were introduced and heated to 70° C. Then 32.4 g of IPDI were added, the mixture was stirred for five minutes, and 0.09 g of TIB Kat 216 (dioctyltin dilaurate) was added. The mixture was stirred for 30 min, and 397.9 g of an alkoxysilyl polyether from Example 7 were added. This was followed by stirring for a further 5 hours.

Example 13 (Comparative Example)

1284.8 g of alkoxysilyl polyether from Example 4 were introduced and heated to 70° C. Then 42.0 g of IPDI were added, the mixture was stirred for five minutes, and 0.08 g of TIB Kat 216 (dioctyltin dilaurate) was added. The mixture was stirred for 30 minutes and 79.6 g of a polyether of the general formula. $C_4H_9O[CH_2CH(CH_3)O]_{5.6}H$ was added. This was followed by stirring for a further 5 hours.

Example 14

643 g of alkoxysilyl polyether from Example 5 were introduced and heated to 70° C. Then 26 g of IPDI were added, the mixture was stirred for five minutes, and 0.06 g of TIB Kat 216 (dioctyltin dilaurate) was added. The mixture was stirred for 30 min, and 331 g of an alkoxysilyl polyether from Example 7 were added. This was followed by stirring for a further 5 hours.

Example 15

662 g of alkoxysilyl polyether from Example 6 were introduced and heated to 70° C. Then 24.4 g of IPDI were added, the mixture was stirred for five minutes, and 0.06 g of TIB Kat 216 (dioctyltin dilaurate) was added. The mixture was stirred for 30 min, and 314 g of an alkoxysilyl polyether from Example 7 were added. This was followed by stirring for a further 5 hours.

Example 16

482 g of alkoxysilyl polyether from Example 2 were introduced and heated to 70° C. Then 19.2 g of IPDI were added, the mixture was stirred for five minutes, and 0.06 g of TIB Kat 216 (dioctyltin dilaurate) was added. The mixture was stirred for 30 min, and 499 g of an alkoxysilyl polyether from Example 8 were added. This was followed by stirring for a further 5 hours.

Performance Evaluation:
Preparation of the Room-Temperature-Applicable Adhesive/Sealant Formulations:

25.9 wt % of the alkoxysilyl-modified polymer from the respective examples was intensively mixed with 18.1 wt % of diisoundecyl phthalate, 51.1 wt % of precipitated chalk (Socal® U1S2, Solvay), 0.5 wt % of titanium dioxide (Kronos® 2360, Kronos), 1.4 wt % of adhesion promoter (Dynasylan® AMMO, Evonik), 1.1 wt % of drying agent (Dynasylan® VTMO, Evonik), 1.5 wt % of an antioxidant/stabilizer mixture (ratio of Irganox® 1135 to Tinuvin® 1130 to Tinuvin® 292=1:2:2 ratio) and 0.4 wt % of the curing catalyst (TIB® KAT 223, TIB) in a mixer (Speedmixer® FVS 600, Hausschild). The completed formulation was transferred to PE cartridges, and was stored for at least 24 hours at room temperature prior to application. Given that the formulations of the alkoxysilyl-modified polymers in the examples stated above were identical in all cases, the discussion of the results has been carried out with identification of the alkoxysilyl-modified polymers utilized as the basis of the formulation.

Determination of Tensile Stress at Break and Elongation at Break in Accordance with DIN 53504:

The formulation was knifecoated in a film thickness of 2 mm on a PE surface. The films were stored for 7 days at 23° C. and 50% relative humidity. S2 dumbbell specimens were then punched from the films with the aid of a cutter and a toggle press.

The dumbbell specimens thus produced were clamped for testing into a universal testing machine (from Shimadzu), and determinations were made of the tensile stress at break and elongation at break when the specimens were stretched at a constant velocity (200 mm/min).

Determination of Tear Propagation Resistance in Accordance with DIN ISO 34-1, Method B, Process (a):

The formulation was knifecoated in a film thickness of 2 mm on a PE surface. The films were stored for 7 days at 23° C. and 50% relative humidity. Angular specimens were then punched from the films with the aid of a cutter and a toggle press.

For testing, the angular specimens thus produced were clamped in a universal tester (from Shimadzu), and tear propagation resistance was determined (measurement speed: 500 min/min).

Determination of Tensile Shear Strength of Overlap Bonds in Accordance with DIN EN 1465

Overlap bonds were produced with the prepared formulation. For these bonds, two stainless steel substrates (V2A, 1.4301) were used. The area of the overlap bond was 500 mm$^2$; the layer thickness of the bond was 0.1 mm. The bonds were cured at 23° C. and 50% relative humidity. After 21 days, the bonds were clamped into a universal testing machine (from Shimadzu), and a force was exerted on the adhesive bond at a constant rate (10 mm/min) until the bond fractured. Tensile stress at break was ascertained.

TABLE 2

Viscosities of the alkoxysilyl-modified polymers and mechanical characteristic values of the cured formulation on an S2 dumbbell and on an overlap bond of two V2A steel plates:

| Polymer of example | Viscosity [Pas] (at 25° C.) | S2 dumbbell specimen | | Angular specimen Tear propagation resistance [N/mm] | Adhesive bond Tensile stress at break [N/mm$^2$] |
|---|---|---|---|---|---|
| | | Tensile stress at break [N/mm$^2$] | Elongation at break [%] | | |
| 9  | 70.7  | 645 | 1.8 | 10.2 | 1.4 |
| 10 | 59.6  | 362 | 2.2 | 14.2 | 2.4 |
| 11 | 51.8  | 235 | 2.2 | 8.5  | 2.5 |
| 12 | 39.2  | 163 | 2.4 | 6.5  | 3.2 |
| 13 | 51.0  | 213 | 1.5 | 4.6  | 1.6 |
| 14 | 56.2  | 220 | 2.2 | 8.7  | 2.7 |
| 15 | 111.4 | 375 | 2.0 | 12.8 | 2.0 |
| 16 | 62.3  | 420 | 1.9 | 7.3  | 1.7 |

The tensile stress at break of the adhesive bond of Inventive Examples 10-12 and 14-16 was increased throughout compared to the tensile stresses at break of Comparative Examples 9 and 13, which indicated higher crosslinking of the polymer network formed.

The characteristic values for the S2 dumbbell specimen from Comparative Example 9 reported in Table 2 suggested a similarly good profile of properties to the Inventive Examples 10-12 and 14-16. However, the S2 dumbbell specimen of Comparative Example 9 showed plastic stress-strain characteristics, meaning that it did not have any elastic recovery at all and was thus entirely unsuitable for the envisaged adhesive and/or sealant applications.

Compared to the S2 dumbbell specimen of Comparative Example 13, in all cases, the inventive examples achieved a noticeable increase in tear propagation resistance, and in the case of Example 10 actually by more than 200%. Noticeable improvements in tensile stress at break and elongation at break were possible in all cases through the alkoxysilyl-modified polymers of the invention.

European patent application 16154170.1 filed Feb. 4, 2016, is incorporated herein by reference.

Numerous modifications and variation on the present invention are possible in light of the above teachings. It is therefore to be understood that within the scope of the appended claims, the invention may be practiced otherwise than as specifically described herein.

The invention claimed is:

1. An alkoxysilyl-modified polymer of formula (I)

    Formula (I)

wherein the M and D fragments are not linked directly to one another but are linked with one another via the UR groups, the AP groups, or both, and the UR and AP groups are not linked directly to one another but are linked with one another via the M fragments, the D fragments, or both wherein
i=1 to 2,
j=1 to 10,
u=0 to 11
V=0 to 6,
with the proviso that u+v≥1,
wherein each M is independently an alkoxysilyl-modified polyether radical of formula (Ia)

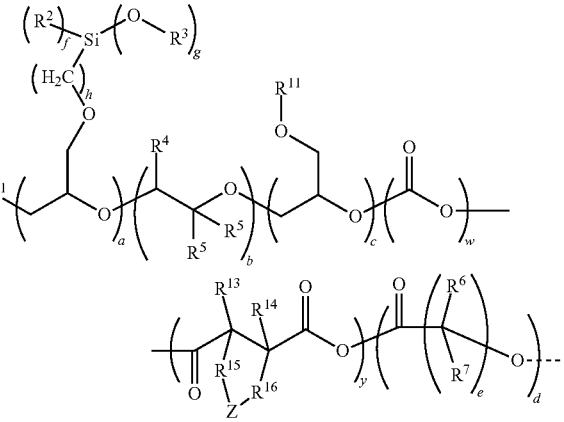

Formula (Ia)

wherein
a=0.1 to 100,
b=2 to 1000,
c=0 to 200,
d=0 to 200,
w=0 to 200,
y=0 to 500,
e=1 to 10,
f=0 to 2
g=1 to 3,
with the proviso that g+f=3,
h=0 to 10,
wherein the groups with the indices a, b, c, d, w and y are freely permutable over a molecule chain, and each of the groups with the indices w and y do not follow itself or the other respective group, and with the proviso that the monomer units of the fragments having the indices a, b, c, d, w and y, and wherein each R$^1$ is independently a saturated or unsaturated, linear or branched organic hydrocarbyl radical optionally substituted by at least one heteroatom selected from the group consisting of O, S, and N, each $R^2$ is independently an alkyl group comprising 1 to 8 carbon atoms, each $R^3$ is independently an alkyl group comprising 1 to 8 carbon atoms, each $R^4$ is independently a hydrogen radical, an alkyl group comprising 1 to 20 carbon atoms, an aryl group, or an alkaryl group, each $R^5$ is independently a hydrogen radical or an alkyl group comprising 1 to 8 carbon atoms, or $R^4$ and one of the $R^5$ radicals may together form a ring including the atoms to which $R^4$ and $R^5$ are bonded, each $R^6$ and $R^7$ are independently a hydrogen radical, an alkyl group comprising 1 to 20 carbon atoms, an aryl group, an alkaryl group, or an alkoxy group, each $R^{11}$ is independently an optionally substituted saturated or unsaturated, aliphatic or aromatic hydrocarbyl radical comprising 2 to 30 carbon atoms, each $R^{13}$ and $R^{14}$ are independently hydrogen or an organic radical, or $R^{13}$, $R^{14}$, or both may be absent and wherein $R^{13}$ and $R^{14}$ are absent, a C=C double bond is in place of the $R^{13}$ and $R^{14}$ radicals, the bridging Z fragment may be present or absent, wherein, in the absence of the bridging Z fragment, $R^{15}$ and $R^{16}$ are each independently hydrogen or an organic radical, and, wherein one of the radicals $R^{13}$ or $R^{14}$ is absent, the respective geminal radical is an alkylidene radical, wherein, in the presence of the bridging Z fragment, $R^{15}$ and $R^{16}$ are hydrocarbyl radicals bridged cycloaliphatically or aromatically via the Z fragment, wherein Z is an optionally substituted divalent alkylene or alkenylene radical, with the proviso that the sum total of all indices b in formula (Ia) and formula (II) is at least 5 and the sum total of all indices a in formula (Ia) and formula (II) is greater than 2, and wherein D is a polyether radical $-(D^A)_tD^x$ wherein t is 2, wherein $D^x$ is a t-valent functional, saturated or unsaturated, linear or branched organic hydrocarbyl radical optionally substituted with at least one heteroatom selected from the group consisting of O, S, Si and N, wherein each $D^A$ radical is covalently bonded to the $D^x$ radical, or $D^x$ is a multiply fused phenolic group, and wherein $D^A$ is a fragment of formula (II)

Formula (II)

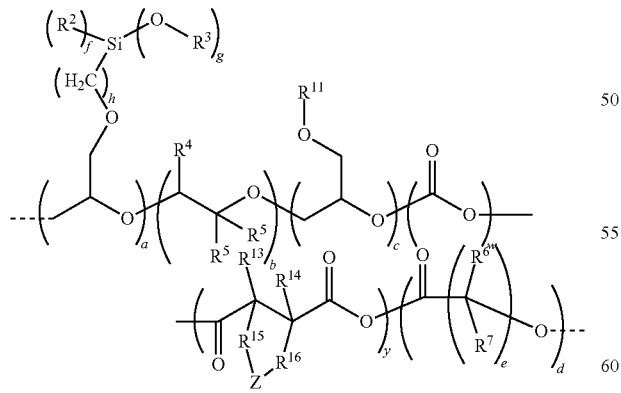

wherein
a=0.1 to 100,
b=2 to 1000,
c=0 to 200,
d=0 to 200,
w=0 to 200,
y=0 to 500,
e=1 to 10,
f=0 to 2
g=1 to 3,
with the proviso that g+f=3,
h=0 to 10,
wherein the groups with the indices a, b, c, d, w and y are freely permutable over a molecule chain, and each of the groups with the indices w and y do not follow itself or the other respective group, wherein the indice a in the fragment M is greater than two times the indice a in the fragment D in the formula (I), and wherein each $R^2$ is independently an alkyl group comprising 1 to 8 carbon atoms, each $R^3$ is independently an alkyl group comprising 1 to 8 carbon atoms, each $R^4$ is independently a hydrogen radical, an alkyl group comprising 1 to 20 carbon atoms, an aryl group, or an alkaryl group, each $R^5$ is independently a hydrogen radical or an alkyl group comprising 1 to 8 carbon atoms, or $R^4$ and one of the $R^5$ radicals may together form a ring including the atoms to which $R^4$ and $R^5$ are bonded, each $R^6$ and $R^7$ are independently a hydrogen radical, an alkyl group comprising 1 to 20 carbon atoms, an aryl group, an alkaryl group, or an alkoxy group, each $R^{11}$ is independently an optionally substituted saturated or unsaturated, aliphatic or aromatic hydrocarbyl radical comprising 2 to 30 carbon atoms, each $R^{13}$ and $R^{14}$ are independently hydrogen or an organic radical, or $R^{13}$, $R^{14}$, or both may be absent, and wherein R13 and R14 are absent a C=C double bond is in place of the $R^{13}$ and $R^{14}$ radicals, the bridging Z fragment may be present or absent, wherein, in the absence of the bridging Z fragment, $R^{15}$ and $R^{16}$ are each independently hydrogen or an organic radical, and, wherein one of the radicals $R^{13}$ or $R^{14}$ is absent, the respective geminal radical is an alkylidene radical, wherein, in the presence of the bridging Z fragment, $R^{15}$ and $R^{16}$ are hydrocarbyl radicals bridged cycloaliphatically or aromatically via the Z fragment, wherein Z is an optionally substituted divalent alkylene or alkenylene radical, each UR is independently a divalent radical of form —U-$D^C$-U—, wherein U is a —C(O)NH— group bonded via the nitrogen to $D^C$, each $D^C$ is independently a divalent substituted or unsubstituted, linear or branched, saturated or unsaturated hydrocarbyl radical comprising 1 to 30 carbon atoms, selected from alkyl, alkenyl, aryl or alkaryl radicals, and optionally substituted by at least one heteroatom selected from the group consisting of O, N and S, each AP is independently a radical of general formula (IIIa) or (IIIb)

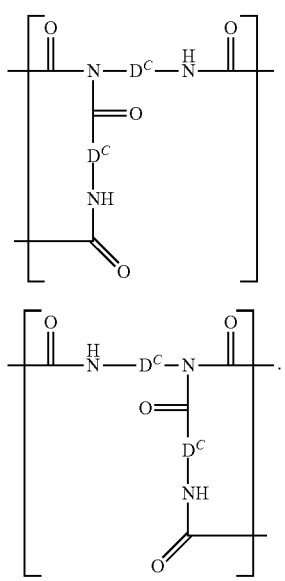

Formula (IIIa)

Formula (IIIb)

2. The alkoxysilyl-modified polymer according to claim 1, wherein in formula (I),
i=1 to 2,
j=1 to 6,
u=j+1
v=0,
wherein the fragment M corresponds to formula (Ia) wherein
a=0.1 to 50,
b=10 to 500,
c=0 to 20,
d=0 to 20,
w=0 to 20,
y=0 to 20,
e=1 to 10,
f=0 to 2,
g=1 to 3,
with the proviso that g+f=3,
and h=1, 2 or 3, and
wherein the fragment D corresponds to formula (II) wherein
a=0 to 10,
b=10 to 700,
c=0 to 20,
d=0 to 20,
w=0 to 20,
y=0 to 20,
e=1 to 10,
f=0 to 2,
g=1 to 3,
with the proviso that g+f=3,
and h=1, 2 or 3
and wherein
each UR is independently a divalent radical of the form —U-$D^C$-U—, wherein each $D^C$ is independently a divalent substituted or unsubstituted, linear or branched, saturated or unsaturated hydrocarbyl radical comprising 1 to 30 carbon atoms.

3. A method of making the alkoxysilyl-modified polymer according to claim 1, the method comprising the steps of:
(1) reacting at least one dihydroxy-functional starter (A) selected from the group consisting of alcohols with at least one alkylene oxide and polyetherols, with an alkylene oxide and an epoxide comprising an alkoxysilyl group, thereby obtaining an alkoxylation product H-D-H,
(2) reacting at least one monohydroxy-functional starter (B) selected from the group consisting of alcohols with at least one alkylene oxide and polyetherols with at least one alkylene oxide and at least one epoxide comprising an alkoxysilyl group, thereby obtaining a monohydroxy-functional alkoxylation product H-M, and
(3) reacting the alkoxylation product H-D-H and the monohydroxy-functional alkoxylation product H-M with at least one diisocyanate, thereby obtaining the alkoxysilyl-modified polymer.

4. The process according to claim 3, wherein the reacting of the alkoxylation product H-D-H and the monohydroxy-functional alkoxylation product H-M with at least one diisocyanate further comprises reacting the alkoxylation product H-D-H with a diisocyanate, thereby obtaining an NCO-functional intermediate; and reacting the monohydroxy-functional alkoxylation product H-M with the NCO-functional intermediate, thereby obtaining the alkoxysilyl-modified polymer.

5. The process according to claim 4, further comprising reacting the NCO-functional intermediate with a monohydroxy-functional alkoxylation product which does not comprise an alkoxysilyl group.

6. The process according to claim 3, wherein the at least one epoxide comprising an alkoxysilyl group during the reacting (1), the reacting (2), or both is a compound of general formula (V)

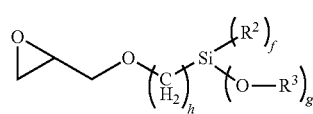

Formula (V)

wherein
f=0 to 2,
g=1 to 3,
with the proviso that g+f=3,
h=0 to 10,
each $R^2$ is independently an alkyl group comprising 1 to 8 carbon atoms, and
each $R^3$ is independently an alkyl group comprising 1 to 8 carbon atoms.

7. The process according to claim 3, wherein the dihydroxy-functional starter (A) is at least one selected from the group consisting of polyetherols, polycarbonate polyols and polyethercarbonates.

8. The process according to claim 3, wherein the diisocyanate is isophorone diisocyanate.

9. The process according to claim 3, wherein the alkoxysilyl-modified polymer has a tear propagation resistance of from 4.6 to 14.2 N/mm.

10. A curable composition, comprising:
at least one alkoxysilyl-modified polymer of claim 1, and
at least one curing catalyst.

11. The curable composition according to claim 10, further comprising one or more adhesion promoters, one or more chemical moisture-drying agents, or both.

12. A method, comprising:
applying the curable composition of claim 10 as an adhesive, a sealant, or both.

13. A method, comprising:
applying a composition comprising the alkoxysilyl-modified polymer of claim 1 to a substrate;
wherein the applying strengthens, levels, modifies, adhesively bonds, seals, and/or coats the substrate.

14. The curable composition according to claim 10, wherein the curable composition has a tear propagation resistance of from 4.6 to 14.2 N/mm.

* * * * *